(12) United States Patent
Hendry

(10) Patent No.: US 12,519,993 B2
(45) Date of Patent: Jan. 6, 2026

(54) MEDIA FILE PROCESSING METHOD AND DEVICE THEREFOR

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 8 days.

(21) Appl. No.: 18/268,404

(22) PCT Filed: Dec. 16, 2021

(86) PCT No.: PCT/KR2021/019210
§ 371 (c)(1),
(2) Date: Jun. 20, 2023

(87) PCT Pub. No.: WO2022/139331
PCT Pub. Date: Jun. 30, 2022

(65) Prior Publication Data
US 2024/0040169 A1 Feb. 1, 2024

Related U.S. Application Data

(60) Provisional application No. 63/128,839, filed on Dec. 21, 2020.

(51) Int. Cl.
*H04N 21/2343* (2011.01)
*H04N 21/236* (2011.01)

(52) U.S. Cl.
CPC ... *H04N 21/234363* (2013.01); *H04N 21/236* (2013.01)

(58) Field of Classification Search
CPC ......... H04N 21/234363; H04N 21/236; H04N 19/132; H04N 19/70; H04N 21/2343; H04N 21/4402; H04N 21/8451; H04N 21/85406; H04N 21/434
See application file for complete search history.

(56) References Cited

U.S. PATENT DOCUMENTS

2020/0275143 A1\* 8/2020 Denoual ........ H04N 21/234327
2022/0086496 A1\* 3/2022 Wang ..................... H04N 19/70

\* cited by examiner

*Primary Examiner* — Anthony Bantamoi
(74) *Attorney, Agent, or Firm* — Fish & Richardson P.C.

(57) ABSTRACT

A media file generation method according to the present document comprises the steps of configuring at least one of an entity group and a sample group, generating a track, and generating the media file including the track and at least one of the entity group and the sample group, wherein: the entity group includes an operation point entity group; the sample group includes an operation point information sample group; on the basis of the track including no VVC bitstream, the track has one of a first track reference for the operation point entity group and a second track reference for a specific track including the operation point information sample group; and the first track reference is different from the second track reference.

17 Claims, 14 Drawing Sheets

MEDIA FILE PROCESSING METHOD AND DEVICE THEREFOR

CROSS-REFERENCE TO RELATED APPLICATIONS

This application is a National Stage application under 35 U.S.C. § 371 of International Application No. PCT/KR2021/019210, filed on Dec. 16, 2021, which claims the benefit of U.S. Provisional Application No. 63/128,839, filed on Dec. 21, 2020. The disclosures of the prior applications are incorporated by reference in their entirety.

BACKGROUND OF THE DISCLOSURE

Field of the Disclosure

The present disclosure relates to a video/image coding technique and, more particularly, to a method and an apparatus for processing a media file on coded image information in a video/image coding system.

Related Art

Recently, the demand for high resolution, high quality image/video such as 4K, 8K or more Ultra High Definition (UHD) video/image is increasing in various fields. As the video/image resolution or quality becomes higher, relatively more amount of information or bits are transmitted than for conventional video/image data. Therefore, if video/image data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual video/image, such as game images/videos, are also growing.

Therefore, a highly efficient image compression technique is required to effectively compress and transmit, store, or play high resolution, high quality video/image showing various characteristics as described above.

SUMMARY OF THE DISCLOSURE

Technical Objects

The present disclosure provides a method and an apparatus for increasing video/image coding efficiency.

The present disclosure also provides a method and an apparatus for generating a media file for coded image information.

The present disclosure also provides a method and an apparatus for processing the media file for the coded image information.

Technical Solutions

According to an embodiment of the present specification, provided herein is a method for generating a media file that is performed by a media file generating apparatus. The method may include the steps of configuring at least one of an entity group or a sample group, generating a track, and generating the media file comprising the track and at least one of the entity group or the sample group, wherein the entity group includes an operating point entity group, wherein the sample group includes an operating point information sample group, wherein, based on the track not including a versatile video coding (VVC) bitstream, the track has one of a first track reference for the operating point entity group or a second track reference for a specific track that contains the operating point information sample group, and wherein the first track reference is different from the second track reference.

According to another embodiment of the present specification, provided herein is a media file generating apparatus. The media file generating apparatus may include an image processor configuring at least one of an entity group or a sample group and generating a track, and a media file generator generating the media file comprising the track and at least one of the entity group or the sample group, wherein the entity group includes an operating point entity group, wherein the sample group includes an operating point information sample group, wherein, based on the track not including a versatile video coding (VVC) bitstream, the track has one of a first track reference for the operating point entity group or a second track reference for a specific track that contains the operating point information sample group, and wherein the first track reference is different from the second track reference.

According to yet another embodiment of the present specification, provided herein is a method for processing a media file that is performed by a media file processing apparatus. The method may include the steps of obtaining the media file comprising a track and at least one of an entity group or a sample group, parsing at least one of the entity group or the sample group, and parsing the track, wherein the entity group includes an operating point entity group, wherein the sample group includes an operating point information sample group, wherein, based on the track not including a versatile video coding (VVC) bitstream, the track has one of a first track reference for the operating point entity group or a second track reference for a specific track that contains the operating point information sample group, and wherein the first track reference is different from the second track reference.

According to yet another embodiment of the present specification, provided herein is a media file processing apparatus. The media file processing apparatus may include a receiver obtaining the media file comprising a track and at least one of an entity group or a sample group, and a media file processor parsing at least one of the entity group or the sample group and parsing the track, wherein the entity group includes an operating point entity group, wherein the sample group includes an operating point information sample group, wherein, based on the track not including a versatile video coding (VVC) bitstream, the track has one of a first track reference for the operating point entity group or a second track reference for a specific track that contains the operating point information sample group, and wherein the first track reference is different from the second track reference.

According to yet another embodiment of the present specification, provided herein is a non-transitory computer-readable digital storage medium having a media file, which is generated by a method for generating a media file, stored therein. In the non-transitory computer-readable digital storage medium, the method for generating a media file may include the steps of configuring at least one of an entity group or a sample group, generating a track, and generating the media file comprising the track and at least one of the entity group or the sample group, wherein the entity group includes an operating point entity group, wherein the sample group includes an operating point information sample group, wherein, based on the track not including a versatile video coding (VVC) bitstream, the track has one of a first track reference for the operating point entity group or a second track reference for a specific track that contains the operating point information sample group, and wherein the first track reference is different from the second track reference.

Effects of the Disclosure

According to the present specification, an entity group includes an operating point entity group, a sample group includes an operating point information sample group. And, based on the track not including a versatile video coding (VVC) bitstream, the track has one of a first track reference for the operating point entity group or a second track reference for a specific track that contains the operating point information sample group, and the first track reference is different from the second track reference. By differentiating track references according to the operating point entity group or operating point information sample group and signaling information in the operating points, complexity in file transport (or delivery) may be reduced, and overall coding efficiency may be enhanced.

DESCRIPTION OF EXEMPLARY EMBODIMENTS

Figure 1:
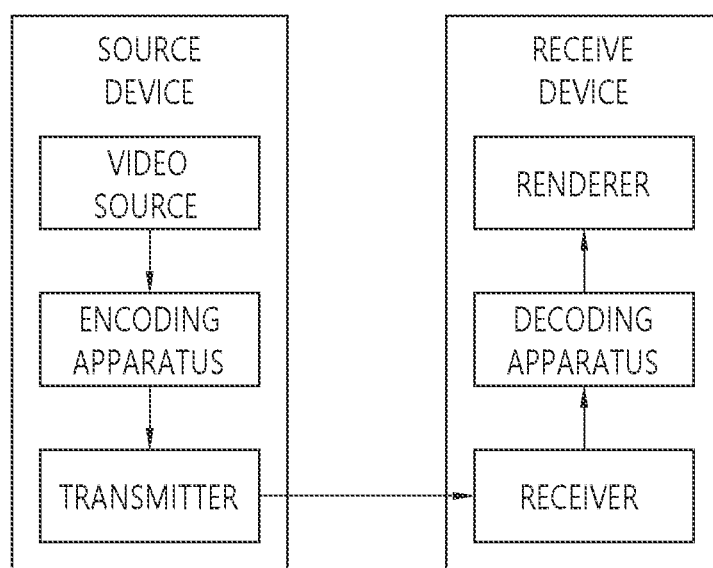
FIG. 1 schematically illustrates an example of a video/image coding system to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals may be used to indicate like elements throughout the drawings, and the same descriptions on the like elements will be omitted.

FIG. 1 schematically illustrates an example of a video/image coding system to which the embodiments of the present document may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. Also, a subpicture may represent a rectangular region of one or more slices within a picture. That is, a subpicture may contain one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In the present disclosure, "A or B" may mean "only A", "only B" or "both A and B". In other words, in the present disclosure, "A or B" may be interpreted as "A and/or B". For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "prediction (intra prediction)" is indicated, "intra prediction" may be proposed as an example of "prediction". In other words, "prediction" in the present disclosure may be not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present disclosure may be implemented individually or may be implemented at the same time.

The following drawings were created to explain a specific example of the present disclosure. Since the names of specific devices described in the drawings or the names of specific signals/messages/fields are presented as an example, the technical features of the present disclosure are not limited to the specific names used in the following drawings.

Figure 2:
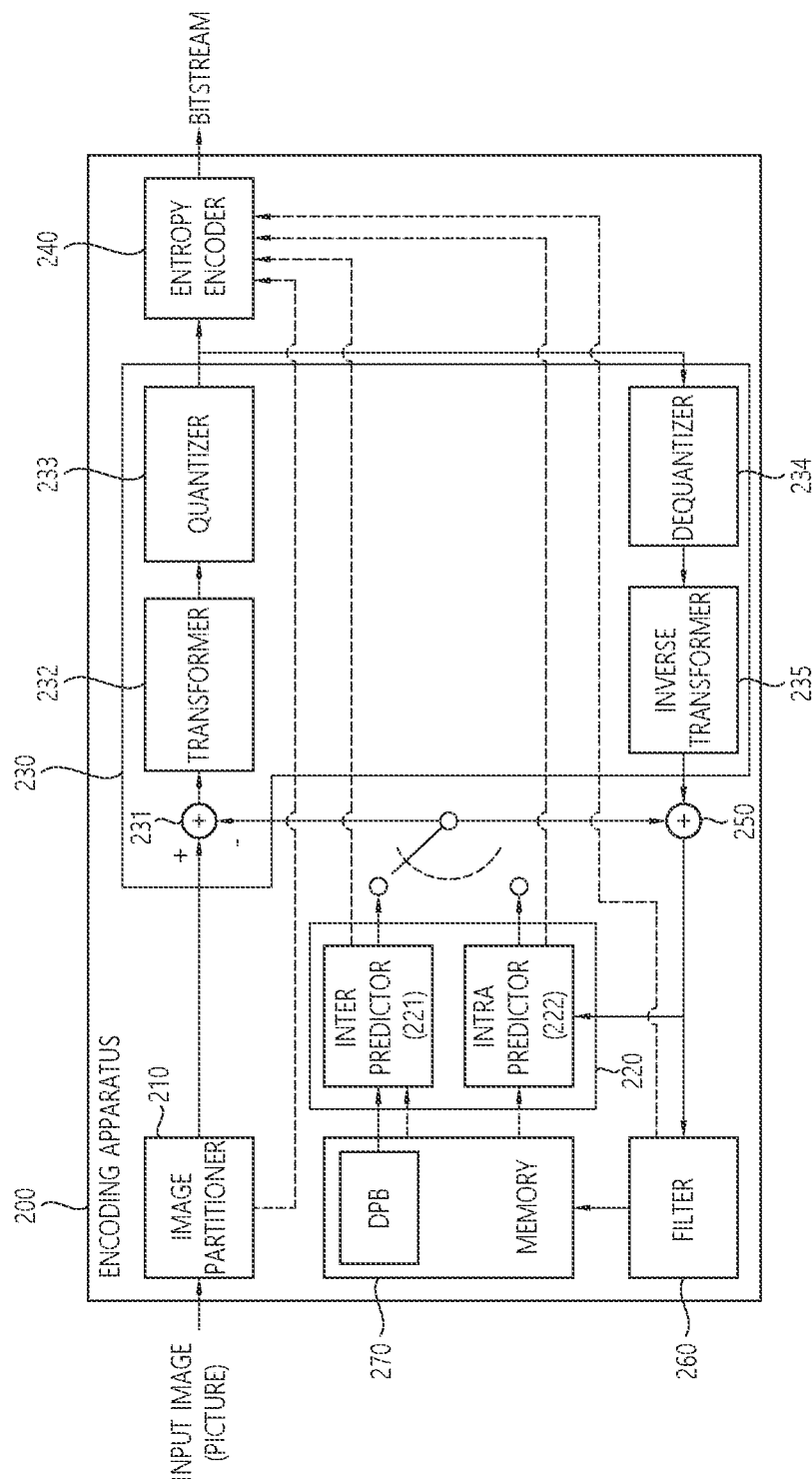
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a part for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
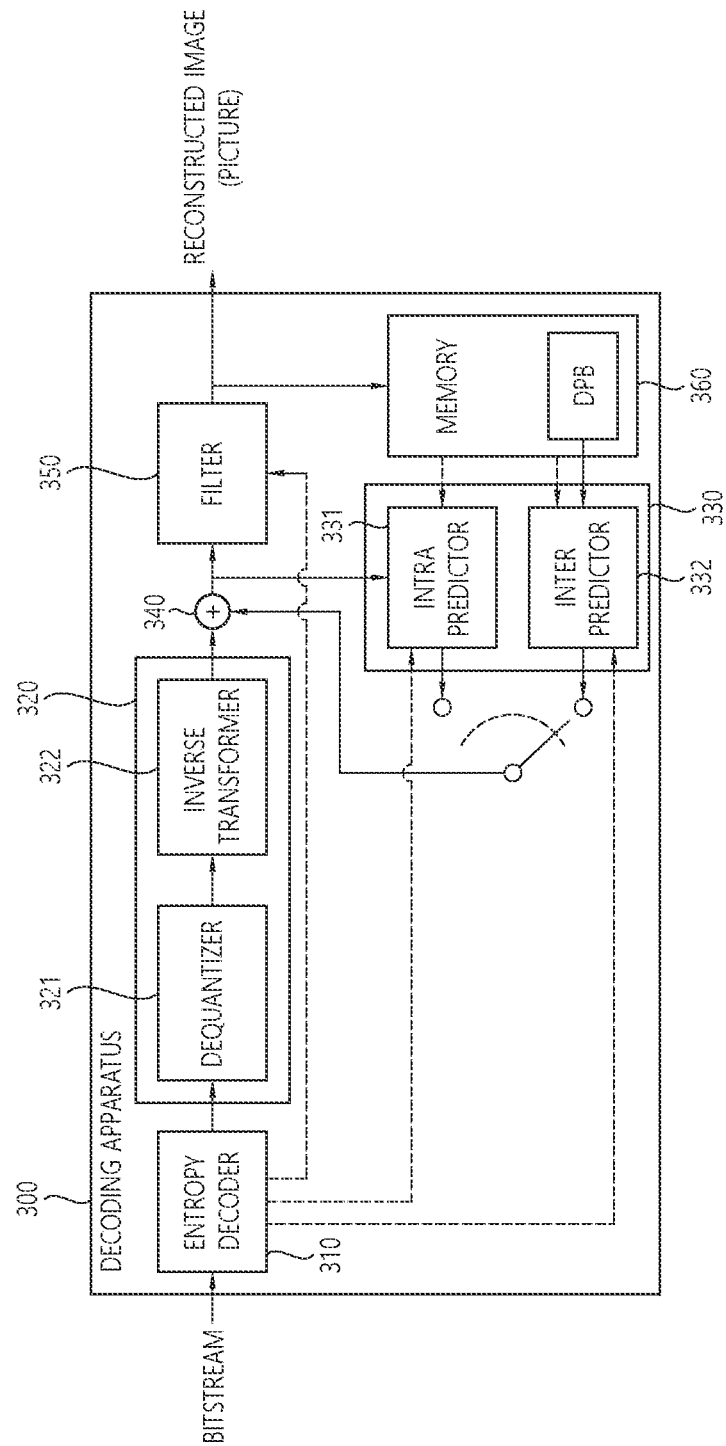
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an intra predictor 331 and an inter predictor 332. The residual processor 320 may include a dequantizer 321 and an inverse transformer 322. The entropy decoder 310, the residual processor 320, the predictor 330, the adder 340, and the filter 350 may be configured by a hardware component (e.g., A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Figure 4:
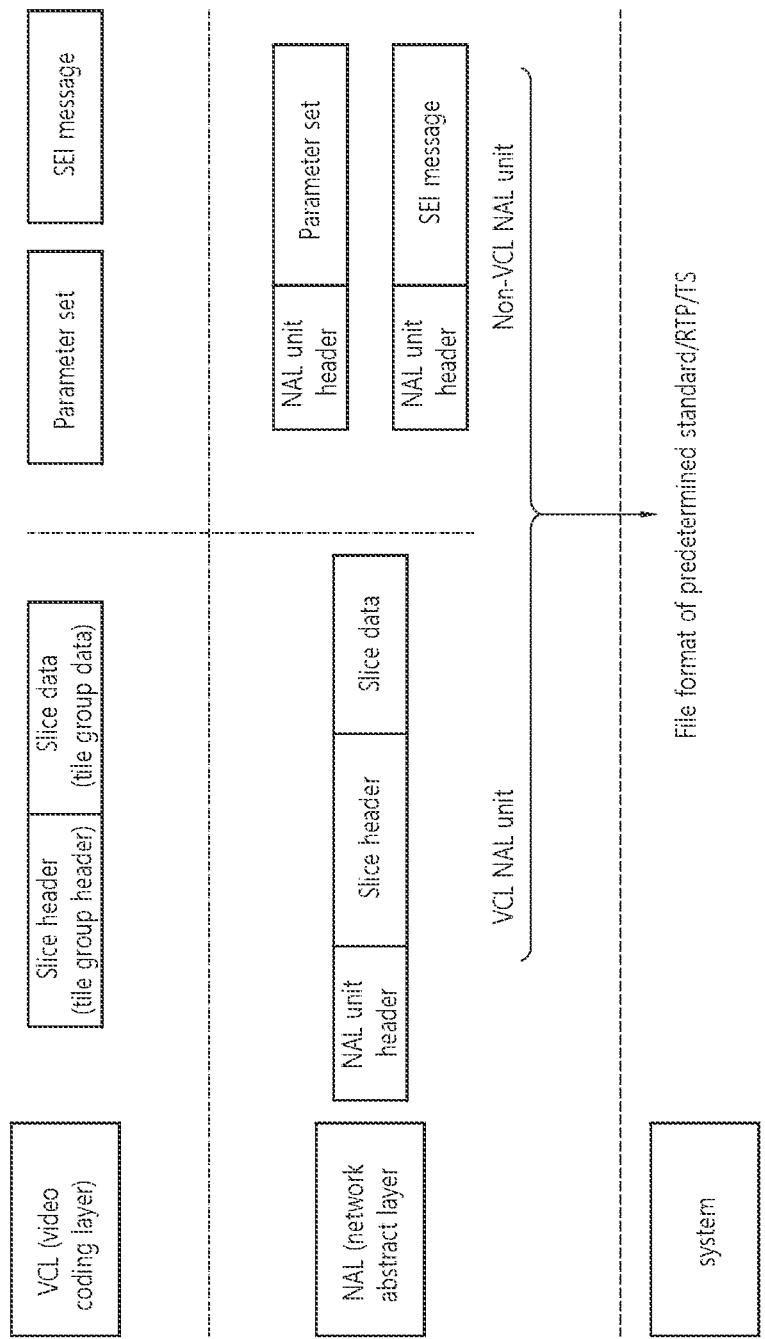
FIG. 4 exemplarily illustrates a layer structure for a coded video/image.

FIG. 4 exemplarily illustrates a layer structure for a coded video/image.

Referring to FIG. 4, a coded video/image may be divided into a video coding layer (VCL) that performs decoding processing of a video/image and handles the decoding processing, a lower system that transmits and stores coded information, and a network abstraction layer (NAL) which exists between the VCL and the lower system, and serves to perform a network adaptation function.

For example, VCL data including compressed image data (slice data), or a picture parameter set (PPS), a sequence parameter set (SPS), or a video parameter set (VPS), or a parameter set including a supplemental enhancement information (SEI) message additionally required in an image decoding process may be generated, in the VCL.

For example, in the NAL, header information (NAL unit data) is added to a raw byte sequence payload (RSRP) generated in the VCL to generate the NAL unit. In this case, the slice data, the parameter set, the SEI message, etc., generated in the VCL may be referred to, for the RBSP. The NAL unit header may include NAL unit type information specified according to RSRP data included in the corresponding NAL unit.

For example, as illustrated in FIG. 4, the NAL unit may be classified into a VCL NAL unit and a non-VCL NAL unit according to the RSRP generated in the VCL. The VCL NAL unit may mean a NAL unit including information (slice data) on the information, and the non-VCL NAL unit may mean a NAL unit including information (parameter set or SEI message) required to decode the image.

The VCL NA unit and the non-VCL NAL unit may be transmitted through a network while header information is added according to a data standard of a sub system. For example, the NAL unit may be converted into a data format of a predetermined standard such as an H.266/VVC file format, a real-time transport protocol (RTP), a transport stream (TS), etc., and transported through various networks.

Further, as described above, in respect to the NAL unit, a NAL unit type may be specified according to an RBSP data structure included in the corresponding NAL unit, and information on the NAL unit type may be stored in a NAL unit header and signaled.

For example, the NAL unit may be classified into a VCL NAL unit type and a non-VCL NAL unit type according to whether the NAL unit includes information (slice data) on the image. Further, the VCL NAL unit type may be classified according to a property and a type of picture included in the VCL NAL unit and the non-VCL NAL unit may be classified according to the type of parameter set.

The following is an example of the NAL unit type specified according to the type of parameter set included in the non-VCL NAL unit type.

Adaptation Parameter Set (APS) NAL unit: Type for the NAL unit including the APS Decoding Parameter Set (DPS) NAL unit: Type for the NAL unit including the DPS Video Parameter Set (VPS) NAL unit: Type for the NAL unit including the VPS Sequence Parameter Set (SPS) NAL unit: Type for the NAL unit including the SPS Picture Parameter Set (PPS) NAL unit: Type for the NAL unit including the PPS Picture header (PH) NAL unit: Type for the NAL unit including the PH The above-described NAL unit types may have syntax information for the NAL unit type and the syntax information may be stored in the NAL unit header and signaled. For example, the syntax information may be nal_unit_type and the NAL unit type may be specified as a value of nal_unit_type.

Meanwhile, one picture may include a plurality of slices, and the slice may include a slice header and slice data. In this case, one picture header may be added for the plurality of slices (a set of the slice header and the slice data). The picture header (picture header syntax) may include information/parameters which may be commonly applied to a picture. The slice header (slice header syntax) may include information/parameters which may be commonly applied to a slice. APS (ASP syntax) or PPS (PPS syntax) may include information/parameters which may be commonly applied to one or more slices or pictures. SPS (SPS syntax) may include information/parameters which may be commonly applied to one or more sequences. VPS (VPS syntax) may include information/parameters which may be commonly applied to a plurality of layers. DPS (DPS syntax) may include information/parameters which may be commonly applied to an overall image. The DPS may include information/parameter related to concatenation of a coded video sequence (CVS).

In the present disclosure, the image/video information encoded from the encoding apparatus to the decoding apparatus and signaled in the form of the bitstream may include intra-picture partitioning related information, intra/inter prediction information, interlayer prediction related information, residual information, and in-loop filtering information, and may include information included in the APS, information included in the PPS, information included in the SPS, information included in the VPS, and/or information included in the DPS. Further, the image/video information may further include information of the NAL unit header.

Meanwhile, the above-described encoded image/video information may be configured based on a media file format in order to generate the media file. For example, the encoded image/video information may form a media file (segment) based on one or more NAL units/sample entries for the encoded image/video information. The media file may include a sample entry and a track. For example, the media file (segment) may include various records, and each record information related to an image/video or information related to the media file format. Further, for example, one or more NAL units may be stored in a configuration record (or decoder configuration record, or VVC decoder configuration record) field of the media file. Here, the field may also be called a syntax element.

For example, as a media file format to which the method/embodiment disclosed in the present disclosure may be applied, ISO Base Media File Format (ISOBMFF) may be used. The ISOBMFF may be used based on a lot of codec encapsulation formats such as an AVC file format, an HEVC file format, and/or a VVC file format and a lot of multimedia container formats such as an MPEG-4 file format, a 3GPP file format (3GP), and/or a DVB file format. Further, static media and metadata such as the image may be stored in a file according to the ISOBMFF in addition to continuous media such as audio and video. A file structuralized according to the ISOBMFF may be used for various purposes including local media file playback, progressive downloading of a remote file, segments for dynamic adaptive streaming over HTTP (DASH), containers and packetization instructions of contents to be streamed, recording of received real-time media streams, etc.

A 'box' to be described below may be an elementary syntax element of the ISOBMFF. An ISOBMFF file may be constituted by a sequence of boxes, and another box may be included in the box. For example, a movie box (a box in which a grouping type is 'moov') may include metadata for continuous media streams including the media file, and each stream may be displayed as the track in the file. The metadata may be included in a track box (a box in which the grouping type is 'trak'), and a media content of the track may be included in a media data box (a box in which the grouping type is 'mdat') or directly included in a separate file. The media content of the track may be constituted by a sequence of samples such as audio or video access units. For example, the ISOBMFF may specify tracks of types such as a media track including an elementary media stream, a hint track including media transmission instructions or representing a received packet stream, and a timed metadata track including time synchronized metadata.

Further, the ISOBMFF is designed for a storage usage, but is very useful even for streaming such as progressive download or DASH, for example. Movie fragments defined in the ISOMBFF may be used for a streaming usage. A fragmented ISOBMFF file may be represented by two tracks related to the video and the audio, for example. For example, when a random access is included after receiving the 'moov' box, all movie fragments 'moof' may be decoded together with related media data.

Further, the metadata of each track may include a coding or encapsulation format used for the track and a list of sample description entries providing initialization data required for processing the corresponding format. Further, each sample may be concatenated to one of the sample description entries of the track.

When the ISOBMFF is used, sample-specific metadata may be specified by various mechanisms. Specific boxes in a sample table box (a box in which the grouping type is 'stb1') may be standardized to cope with general requirements. For example, a sync sample box (a box in which the grouping type is 'stss') may be used for listing random access samples. When a sample grouping mechanism is used, samples may be mapped according to a four-character grouping type by a sample group sharing the same property specified as a sample group description entry. Various grouping types may be specified in the ISOBMFF.

Figure 5:
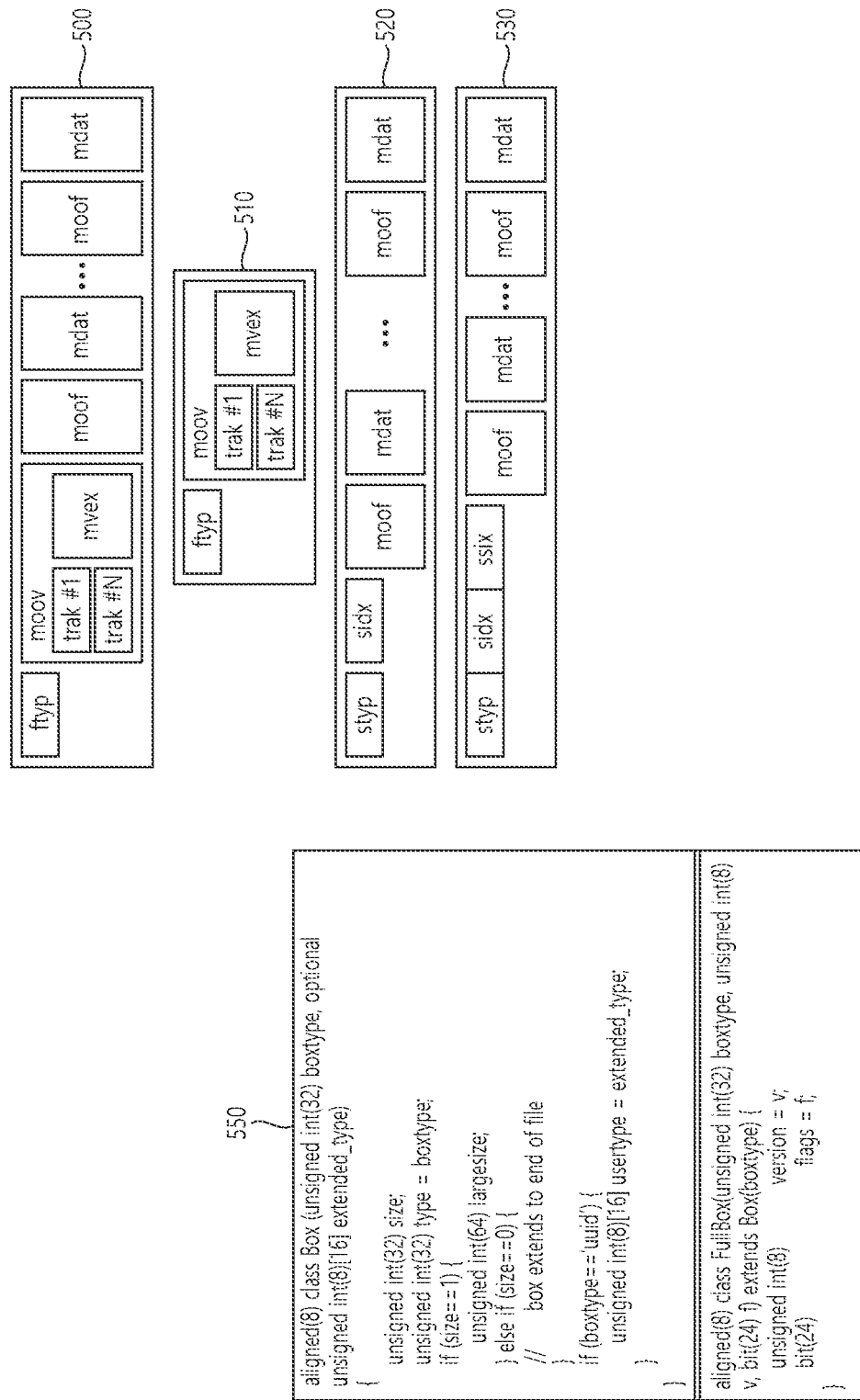
FIGS. 5 and 6 schematically illustrate an example of a media file structure.
Figure 6:
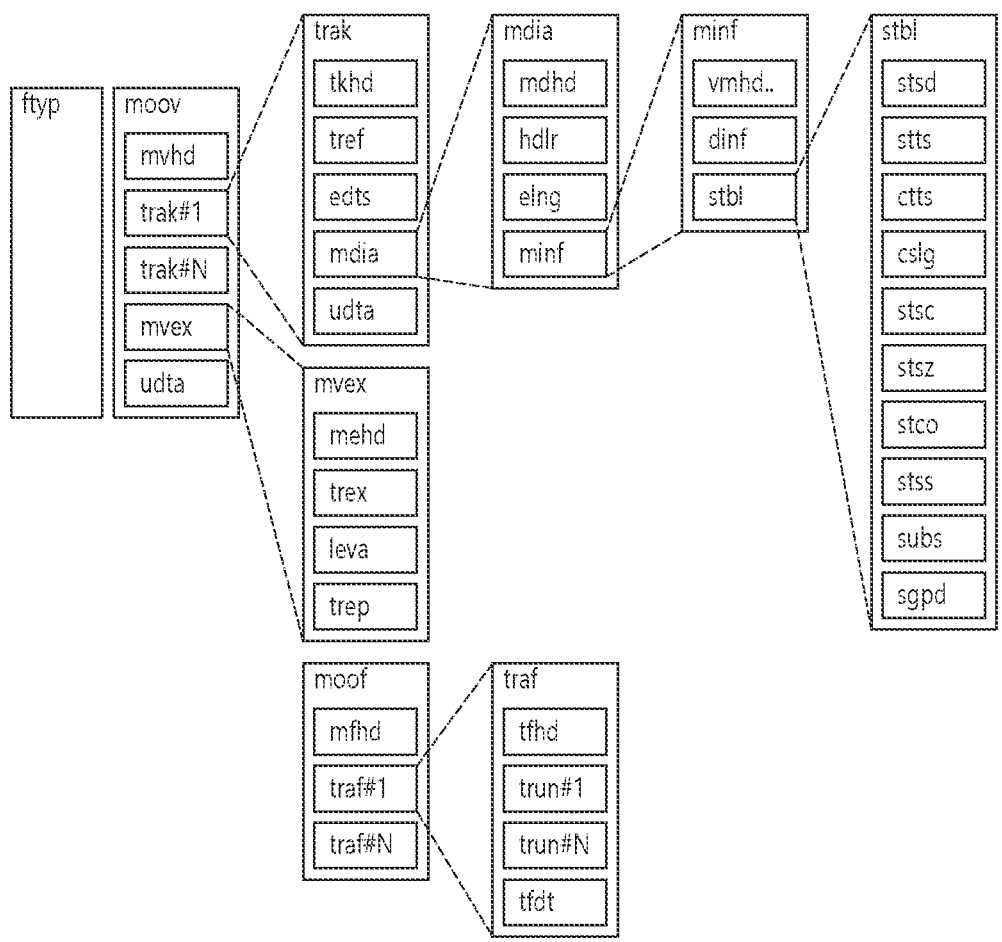

FIGS. 5 and 6 illustrate an example of a media file structure.

A media file may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file may be divided into a plurality of fragments (500). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment (510) may include information related to media decoder initialization except media data. This file may correspond to the aforementioned initialization segment, for example. The initialization segment can include the aforementioned styp box and/or moov box.

A file of the illustrated embodiment (520) may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment (530), an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment (550). In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, fields (properties) for the video/image according to the present disclosure may be forwarded while being included in a DASH based adaptive streaming model.

Figure 7:
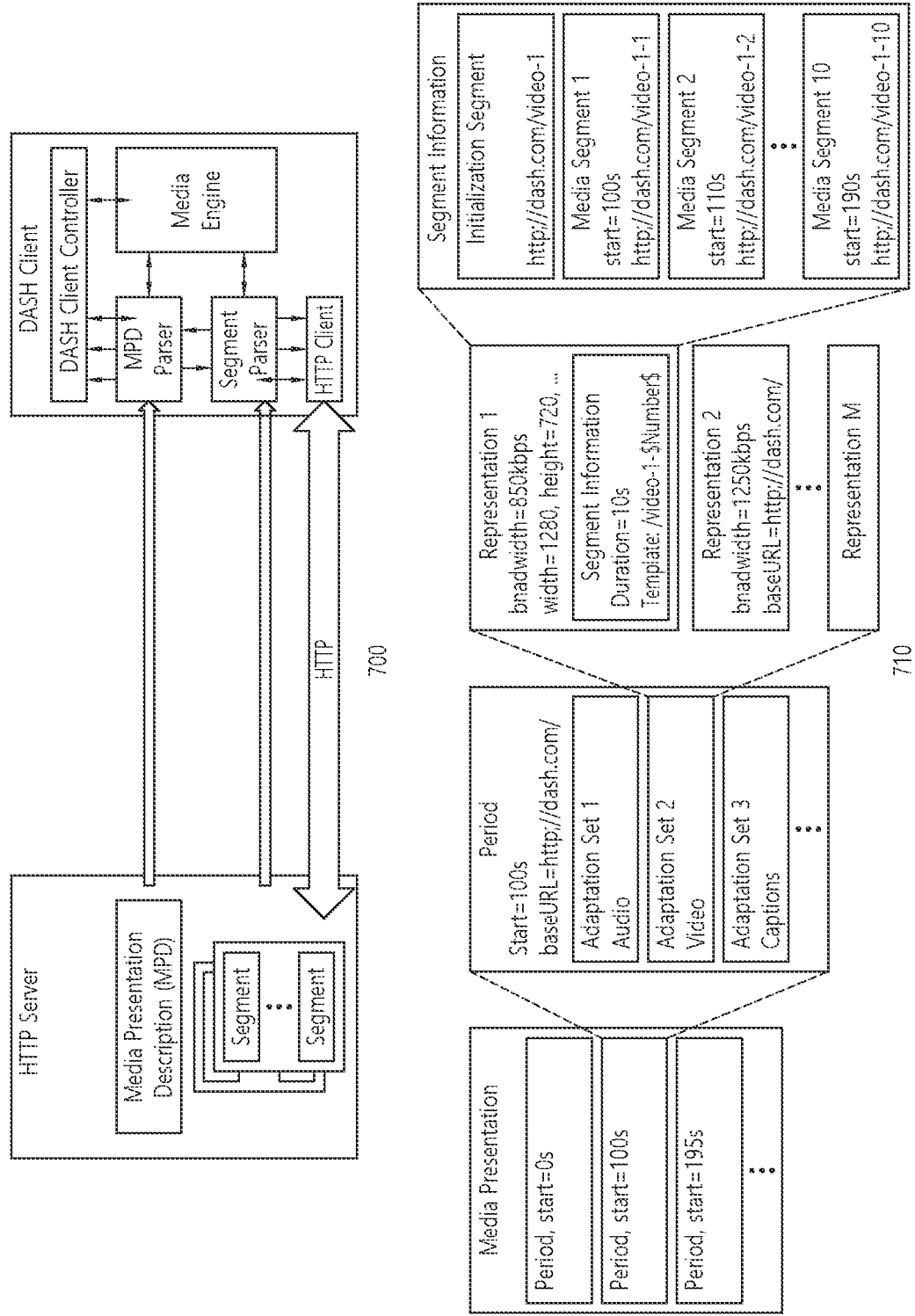
FIG. 7 illustrates an example of the overall operation of a DASH-based adaptive streaming model.

FIG. 7 illustrates an example of the overall operation of a DASH-based adaptive streaming model. The DASH-based adaptive streaming model according to an illustrated embodiment (700) illustrates an operation between an HTTP server and a DASH client. Here, Dynamic Adaptive Streaming over HTTP (DASH) is a protocol for supporting HTTP-based adaptive streaming and can dynamically support streaming according to a network state. Accordingly, AV content may be seamlessly reproduced.

First, the DASH client may acquire an MPD. The MPD may be delivered from a service provider, such as the HTTP server. The DASH client may request a segment from the server using segment access information described in the MPD. Here, this request may be performed in view of the network condition.

After acquiring the segment, the DASH client may process the segment in a media engine and may display the segment on a screen. The DASH client may request and acquire a necessary segment in view of reproduction time and/or the network state in real time (adaptive streaming). Accordingly, content may be seamlessly reproduced.

The media presentation description (MPD) is a file including detailed information for allowing the DASH client to dynamically acquire a segment and may be expressed in XML format.

A DASH client controller may generate a command to request an MPD and/or a segment in view of the network state. In addition, the controller may control acquired information to be used in an internal block, such as the media engine.

An MPD parser may parse the acquired MPD in real time. Accordingly, the DASH client controller can generate a command to acquire a required segment.

A segment parser may parse the acquired segment in real time. Depending on pieces of information included in the segment, internal blocks including the media engine may perform certain operations.

An HTTP client may request a required MPD and/or segment from the HTTP server. The HTTP client may also deliver an MPD and/or segment acquired from the server to the MPD parser or the segment parser.

The media engine may display content on a screen using media data included in the segment. Here, pieces of information of the MPD may be used.

A DASH data model may have a hierarchical structure (710). A media presentation may be described by the MPD. The MPD may describe a temporal sequence of a plurality of periods forming a media presentation. A period may represent one section of media content.

In one section, pieces of data may be included in adaptation sets. An adaptation set may be a collection of a plurality of media content components that can be exchanged with each other. An adaptation set may include a collection of representations. A representation may correspond to a media content component. Within one representation, content may be temporally divided into a plurality of segments, which may be for proper accessibility and delivery. The URL of each segment may be provided to enable access to each segment.

The MPD may provide information related to the media presentation, and a period element, an adaptation set element, and a presentation element may describe a period, an adaptation set, and a presentation, respectively. A representation may be divided into sub-representations, and a sub-representation element may describe a sub-representation.

Common properties/elements may be defined, which may be applied to (included in) an adaptation set, a representation, a sub-representation, or the like. Among the common properties/elements, there may be an essential property and/or a supplemental property.

The essential property may be information including elements that are considered essential in processing media presentation-related data. The supplemental property may be information including elements that may be used for processing the media presentation-related data. Descriptors to be described in the following embodiments may be defined and delivered in an essential property and/or a supplemental property when delivered via the MPD.

Meanwhile, a 'sample' to be described below may be all data related to a single time or a single element of one of three sample arrays (Y, Cb, and Cr) representing the picture. For example, when the terminology 'sample' is used in a context of the track (of the media file format), the 'sample' may mean all data related to the single time of the corresponding track. Here, the time may be a decoding time or a composition time. Further, for example, when the terminology 'sample' is used in the context of the picture, that is, when the 'sample' is used as a terminology of the picture like 'luma sample', the 'sample' may represent the single element in one of three sample arrays representing the picture.

To store VVC content, three types of elementary streams may be defined as follows.

A video elementary stream including VCL NAL units and not including any parameter sets, DCI, or OPI NAL unit; all parameter sets, DCI, and OPI NAL unit may be stored in one or more sample entries. At this point, the video elementary stream may include a non-VCL NAL unit that is not a parameter set, not a DCI NAL unit, nor an OPI NAL unit.

A video and parameter set elementary stream that includes a VCL NAL unit, that may include parameter sets, DCI, or OPI NAL unit, and that may have parameters sets, DCI, or OPI NAL unit stored in one or more sample entries.

A non-VCL elementary stream including only a non-VCL NAL unit. At this point, a non-VCL NAL unit is synchronized with an elementary stream included in a video track. At this point, a VVC non-VCL track does not include a parameter set, DCI, or OPI NAL unit in a sample entry.

Meanwhile, a 'vvc1' or 'vvi1' sample entry is mandatory in at least one track among the tracks transporting (or delivering) a VVC bitstream. A VVC sample entry is defined as a sample entry having a same sample entry type as 'vvc1' or 'vvi1'. Additionally, each sample entry of a VVC track is a VVC sample entry. Additionally, the VVC sample entry includes a VVC Configuration Box, which is defined as described below.

For example, an optional BitRateBox may exist in a VVC sample entry in order to signal bit rate information of a VVC video stream. When used in MPEG-4, extension descriptors that should be inserted in an Elementary Stream Descriptor may also exist.

For example, as authorized in an ISO Base Media File Format, multiple sample entries may be used for indicating a section of a video using other configurations or parameter sets.

When a VVC subpicture track includes a conforming VVC bitstream that may be consumed without other VVC subpicture tracks, a regular VVC sample entry ('vvc1' or 'vvi1') may be used for a VVC subpicture track.

Otherwise, a 'vvs1' sample entry may be used for a VVC subpicture track, and the following restrictions may be applied to a track.

A track_in_movie flag should be equal to 0.
A track should include only one sample entry.
A track should be referenced by at least one VVC base track through a 'subp' track reference.
DCI, OPI, VPS, SPS, PPS, AUD, PH, EOS, EOB, and other AU-level or picture-level non-VCL NAL units should not be present in the sample entry and all samples of a 'vvs1' track.
Unless specified otherwise, child boxes of a video sample entry (e.g., CleanApertureBox and PixelAspectRatio- Box) should not exist in a sample entry. And, if such child boxes exist, they should be ignored.

If all VCL NAL units included in a sample do not follow the sync sample requirements, the sample is not indicated as a sync sample.

Composition time offset information for a sample of a 'vvsl' track does not exist.

Subsample information for a sample of a 'vvsl' track may exist. If such information exists, the subsample information should follow the definition of subsamples for a VVC.

Meanwhile, a VVC track may include an entry including one of a track ID value of a VVC subpicture track and a track_group_id value of an 'alte' track group of a VVC subpicture track together with a 'subp' track reference.

A sample group of a 'spor' type should exist in each VVC base track.

[Ed. (MH): a dedicated sample entry type for a VVC base track may indicate a VVC base track through a codecs MIME parameter of a track type. Conversely, it may not be preferable to designate numerous VVC sample entry types.

Meanwhile, a VvcNALUConfigBox may be included in a sample entry of a 'vvsl' type.

For example, when a VVC subpicture track is referenced by a VVC base track, which includes a 'spor' sample group description entry having a subpic_id_info_flag that is equal to 1, the VVC subpicture track includes a subpicture ID sample group description that potentially uses a default sample grouping mechanism.

For example, when a sample entry name is 'vvc1' or 'vvi1', a stream having the corresponding sample entry applied thereto should be a VVC stream that is compliant in view of a VVC decoder operating under a configuration (including profile, tier, and level), which is provided by a VVCConfigurationBox.

For example, when a sample entry name is 'vvc1', a value of array_completeness should be equal to 1 for arrays of DCI, VPS, SPS, and PPS NAL units, and the value of array_completeness should be equal to 0 for all other arrays. When a sample entry name is 'vvi1', the value of array_completeness should be equal to 0 for all arrays.

For example, when a track does not natively include a VVC bitstream, and when the track does not indicate a VVC bitstream after resolving 'subp' and 'vvcN' track references (if existing), the track should include a track reference of an 'oref' type for a track delivering a 'vopi' sample group or an Operating Point Entity Group.

Meanwhile, for example, when a single-layer VVC bitstream includes two temporal sublayers each being stored in a different track, the track including a sublayer having a TemporalId that is equal to 1 includes an 'oref' track reference for a track, which includes a sublayer having a TemporalId that is equal to 0.

Meanwhile, an operating point may be a temporal subset of an Output Layer Set (OLS) that may be identified by an OLS index and a highest value of a TemporalId. Each operating point may be related to a profile, a tier, and a level (i.e., PTL) that defines a conformance point of the operating point.

For example, operating point information of an ISO based media file format (ISOBMFF) for VVC may be signaled from a sample for a group box having a grouping type of 'vopi' or may be signaled from an entity group of an 'opeg' type. The information is needed for identifying a sample and sample entries for each operating point.

Meanwhile, Applications may be provided with information on a VVC bitstream that is given by using an operating point information sample group ('vopi') and different operating points being provided from their constitution (or configuration). For example, each operating point may be related to the signaling of an OLS, a highest TemporalId value, and profile, level, and tier. All of the above-described information may be captured by a 'vopi' sample group. Apart from the above-described information, the sample group may also provide dependency information among layers.

For example, when one or more VVC tracks exist for a VVC bitstream and an Operating Point entity group does not exist for the VVC bitstream, both of the following details may be applied.

Among the VVC tracks for a VVC bitstream, there should be only one track that delivers (or transports) a 'vopi' sample group.

All other VVC tracks of the VVC bitstream should have a track reference of an 'oref' type for a track that delivers (or transports) a 'vopi' sample group.

For example, for any specific sample of a given track, a temporally collocated sample of a different track may be defined as a sample having a same decoding time as the specific sample. For each sample SN of a track TN having an 'oref' track reference for a track Tk, which delivers the 'vopi' sample group, the following may be applied.

When a temporal collocated sample Sk exists in a track Tk, a sample SN may be related to the same 'vopi' sample group entity as sample Sk.

Otherwise, a sample SN may be related to a same 'vopi' sample group entity as a last sample of track Tk, which precedes sample Sk in the decoding time.

Meanwhile, when several VPSs are referenced by a VVC bitstream, several entities may have to be included in a sample group description box to which the grouping_type 'vopi' belongs. In a more general (or regular) case where a single VPS exists, it may be recommended to include an operating point information sample group in a sample table box, without including it in each track fragment, by using a default sample group mechanism, which is defined in ISO/IEC 14496-12.

Additionally, a grouping_type_parameter may not be defined for SampleToGroupBox having a grouping type of 'vopi'.

The syntax of the 'vopi' sample group including the above-described operating point information, i.e., the operating point information sample group, may be as shown below in the following table.

TABLE 1

```
class VvcOperatingPointsRecord {
    unsigned int(8) num_profile_tier_level_minus1;
    for (i=0; i<=num_profile_tier_level_minus1; i++) {
        unsigned int(8) ptl_max_temporal_id[i];
        VvcPTLRecord (ptl_max_temporal_id[i]+1) ptl[i];
    }
    unsigned int(1) all_independent_layers_flag;
    bit(7) reserved = 0;
```

TABLE 1-continued

```
if (all_independent_layers_flag) {
   unsigned int(1) each_layer_is_an_ols_flag;
   bit(7) reserved = 0;
} else
   unsigned int(8) ols_mode_idc;
bit(7) reserved = 0;
unsigned int(9) num_olss;
for (i=0; i<nom_olss: i++) {
   unsigned int(8) ptl_idx[i];
   unsigned int(9) output_layer_set_idx[i];
   unsigned int(6) Layer_count[i];
   bit (1) reserved = 0;
   for (j=0; j<layer_count: j++) {
      unsigned int(6) layer_id[i] [j];
      unsigned int(1) is_output_layer[i] [j];
      bit(1) reserved = 0;
   }
}
   bit(4) reserved = 0;
   unsigned int(12) num_operating_points;
   for (i=0; i<num_operating_points; i++) {
      unsigned int(9) ols_idx;
      unsigned int(3) max_temporal_id;
      unsigned int(1) frame_rate_info_flag
      unsigned int(1) bit_rate_info_flag
      bit(5) reserved = 0;
      unsigned int(2) chroma_format_idc;
      unsigned int(3) bit_depth_minus8;
      unsigned_int(16) picture_width;
      unsigned_int(16) picture_height;
      if (frame_rate_info_flag) {
         unsigned int(16) avgFrameRate;
         bit(6) reserved = 0;
         unsigned int(2) constantFrameRate;
      }
      if (bit_rate_info_flag) {
         unsigned int(32) maxBitRate;
         unsigned int(32) avgBitRate;
      }
   }
   unsigned int(8) max_layer_count;
   for (i=0; i<max_layer_count: i++) {
      unsigned int(8) layerID;
      unsigned int(8) num_direct_ref_layers;
      for (j=0; j<num_direct_ref_layers; j++) {
         unsigned int(8) direct_ref_layerID;
         unsigned int(8) max_tid_il_ref_pics_plus1;
      }
   }
}
   classs VvcOperatingPointsinformation extends VisualSampleGroupEntry ('vopi') {
      VvcOperatingPointsRecord oinf;
   }
}
```

Additionally, semantics for the syntax of the operating points information sample group may be as shown below in the following table.

TABLE 2 num_profile_tier_level minus1 plus 1 gives the number of the subsequent profiles, tier, and level combinations as well as the associated fields,
ptl_max_temporal_id[i]: Gives the maximum TemporalID of NAL units of the associated bitstream for the specified i-th profile, tier, and level structure.
    NOTE 1:    The semantics of ptl_max_temporal_id[i] and max_temporal_id of an operating point, given below, are different even though they may carry the same numerical value.
ptl[i] specifies the i-th profile, tier, and level structure.
all_independent_layers_flag,    each_layer_is_an_ols_flag,
  ols_mode_idc and max_tid_il_ref_pics_plus1 are defined in ISO/IEC 23090-3.
num_olss specifies the number of output layer sets signalled in this syntax structure. The value of num_olss shall be less than or equal to the value of TotalNumOlss as specified in ISO/IEC 23090-3.
ptl_idx[i] specifies the zero-based index of the listed profile, tier, and level structure for the i-th output layer set signalled in this syntax structure
output_layer_set_idx[i] is the output layer set index of the i-th output layer set signalled in this syntax structure.

TABLE 2-continued layer_count[i] specifies the number of layers in the i-th output layer set signalled in this syntax structure.
layer_id[i] [j] specifies the nuh_layer_id value for the j-th layer in the i-th output layer set signalled in this syntax structure.
is_output_layer[i] [j] equal to 1 specifies that the j-th layer is an output layer in the i-th output layer set signalled in this syntax structure. is_output_layer[i][j] equal to 0 specifies that the j-th layer in not an output layer in the i-th output layer set signalled in this syntax structure.
num_operating_points: Gives the number of operating points for which the information follows.
ols_idx is the index to the list of output layer sets signalled in this syntax structure for the operating point
max_temporal_id indicates the maximum TemporalId of NAL units of this operating point.
frame_rate_info_flag equal to 0 indicates that no frame rate information is present for the operating point. The value 1 indicates that frame rate information is present for the operating point.
bit_rate_info_flag equal to 0 indicates that no bitrate information is present for the operating point. The value 1 indicates that bitrate information is present for the operating point.
chroma_format_idc indicates the chroma format that applies to this operating point. The following constraints apply for chroma_format_idc:
- If this operating point contains only one layer, the value of sps_chroma_format_idc, as defined in ISO/IEC 23090-3, shall be the same in all SPSs referenced by the VCL NAL units in the VVC bitstream of this operating point, and the value of chroma_format_idc shall be equal to that value of sps_chroma_format_idc.
- Otherwise (this operating point contains more than one layer), the value of chroma_format_idc shall be equal to the value of vps_ols_dpb_chroma_format[MultiLayerOlsidx[output_set_idx] ], as defined in ISO/IEC 23090-3.
bit_depth_minus8 indicates the bit depth that applies to this operating point. The following constraints apply for bit_depth_minus8:
- If this operating point contains only one layer, the value of sps_bitdepth_minus8, as defined in ISO/IEC 23090-3, shall be the same in all SPSs referenced by the VCL NAL units in the VVC bitstream of this operating point, and the value of bit_depth_minus8 shall be equal to that value of sps_bitdepth_minus8,
- Otherwise(this operating point contains more than one layer), the value of bit_depth_minus8 shall be equal to the value of vps_ols_dpb_bitdepth_minus8[MultiLayerOlsidx[output_layer_set_idx] ], as defined in ISO/IEC 23090-3.
picture_width indicates the maximum picture width, in units of luma samples, that applies to this operating point. The following constraints apply for picture_width:
- If this operating point contains only one layer, the value of sps_pic_width_max_in_luma_samples, as defined in ISO/IEC 23090-3, shall be the same in all SPSs referenced by the VCL NAL units in the VVC bitstream of this operating point, and the value of picture_width shall be equal to that value of sps_pic_width max_in_luma_samples,
- Otherwise (this operating point contains more than one layer), the value of picture_width shall be equal to the value of vps_ols_dpb_pic_width[MultiLayerOlsidx[output_layer_set_idx] ], as defined in ISO/IEC 23090-3.
picture_height indicates the maximum picture height, in units of luma samples, that applies to this operating point. The following constraints apply for picture_height:
- If this operating point contains only one layer, the value of sps_pic_height_max_in_luma_samples, as defined in ISO/IEC 23090-3, shall be the same in all SPSs referenced by the VCL NAL units in the VVC bitstream of this operating point, and the value of picture_height shall be equal to that value of sps_pic_height_max_in_luma_samples.
- Otherwise (this operating point contains more than one layer), the value of picture_height shall be equal to the value of vps_ols_dpb_pic_height[MultiLayerOlsidx[output_layer_set_idx]], as defined in ISO/IEC 23090-3.
avgFrameRate gives the average frame rate in units of frames/(256 seconds) for the operating point. Value 0 indicates an unspecified average frame rate. When the bitstream of the operating point contains multiple layers, this gives the average access unit rate.
constantFrameRate equal to 1 indicates that the stream of the operating point is of constant frame rate. Value 2 indicates that the representation of each temporal layer in the stream of the operating point is of constant frame rate. Value 0 indicates that the stream of the operating point may or may not be of constant frame rate. When the bitstream of the operating point contains multiple layers, this gives the indication of whether the bitstream of the operating point has constant access unit rate
maxBitRate gives the maximum bit rate in bits/second of the stream of the operating point. over any window of one second.
avgBitRate gives the average bit rate in bits/second of the stream of the operating point.
max_layer_count specifies the count of all unique layers in all of the operating points described in the sample group entry.
layerID specifies nuh_layer_id of a layer for which all the direct reference layers are given in the following loop of direct_ref_layerID.
num_direct_ref_layers specifies the number of direct reference layers for the layer with nuh_layer_id equal to layerID.
direct_ref_layerID indicates nuh_layer_id of the direct reference layer.

TABLE 2-continued max_tid_il_ref_pics_plus1 equal to 0 specifies that the pictures of the layer with
nuh_layer_id equal to direct_ref_layerID that are neither IRAP pictures nor GDR
pictures with ph_recovery_poc_cnt equal to 0 are not used as inter-layer reference pictures
for decoding of pictures of the layer with nuh_layer_id equal to layerID. A value greater
than 0 specifies that, for decoding pictures of the layer with nuh_layer_id equal to
layerID, no picture from the layer with nuh_layer_id equal to
direct_ref_layerID with TemporalId greater than
max_tid_il_ref_pics_plus1 - 1 is used as an inter-layer reference picture and no
APS with nuh_layer_id equal to direct_ref_layerID and TemporalId greater than
max_tid_il_ ref_pics_plus1 - 1 is referenced.

Meanwhile, the operating point entity group may be defined to be able to provide track mapping of the operating points and profile level information of the operating points.

For example, when aggregating samples of a track being mapped to the operating point that is described above in the operating point entity group, an implicit reconstruction process no longer needs to remove any more NAL units in order to obtain a conforming VVC bitstream. A track belonging to the operating points entity group should have a track reference of the 'oref' type for a group_id that is indicated in the operating point entity group and should not deliver (or transport) a 'vopi' sample group.

For example, all entity_id values being included in the operating point entity group should indicate track IDs of a track belonging to the same VVC bitstream. If present (or existing), an OperatingPointGroupBox is included in a GroupsListBox of a file-level MetaBox and is not included in the MetaBox of other levels.

A syntax of the above-described operating point entity group may be as shown below is the following table.

TABLE 3 aligned(8) class OperatingPointGroupBox extends
EntityToGroupBox('opeg',0,0)
{
    unsigned int(8) num_profile_tier_level_minus1;
    for (i=0; i<=num_profile_tier_level_minus1; i++)
        VvcPTLRecord(0) opeg_ptl[i];
    bit(7) reserved = 0;
    unsigned int(9) num_olss;
    for (i=0; i<num_olss; i++) {
        unsigned int(8) ptl_idx[i];
        unsigned int(9) output_layer_set_idx[i];
        unsigned int(6) layer_count[i];
        bit(1) reserved = 0;

TABLE 3-continued for (j=0; j<layer_count; j++) {
            unsigned int(6) layer_id[i] [j];
            unsigned int(1) is_output_layer[i] [j];
            bit(1) reserved = 0;
        }
    }
    bit (4) reserved = 0;
    unsigned int(12) num_operating_points;
    for (i=0; i<num_operating_points; i++ ) {
        unsigned int(9) ols_idx;
        unsigned int(3) max_temporal_id;
        unsigned int(1) frame_rate_info_flag
        unsigned int(1) bit_rate_info_flag
        bit(5) reserved = 0;
        unsigned int(2) chroma_format_idc;
        unsigned int(3) bit_depth_minus8;
        unsigned_int(16) picture_width;
        unsigned_int(16) picture_height;
        if (frame_rate_into_flag) {
            unsigned int (16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
        unsigned int(8) entity_count;
        for (j=0; j<entity_count; j++) {
            unsigned int(8) entity_idx;
        }
    }
}

Additionally, semantics for the syntax of the operating points entity group may be as shown below in the following table.

TABLE 4 num_profile_tier_level_minus1 plus 1 gives the number of following profiles, tier,
    and level combinations as well as the associated fields.
opeg_ptl[i] specifies the i-th profile, tier, and level structure.
num_olas specifies the number of output layer sets signalled in this syntax structure. The value of
    num_olss shall be less than or equal to the value of TotalNumOlss as specified in ISO/IEC
    23090-3.
ptl_idx[i] specifies the zero-based index of the listed profile, tier, and level structure for the i-
    th output layer set signalled in this syntax structure.
output_layer_set_idx[i] is the output layer set index of the i-th output layer set signalled
    in this syntax structure .
layer_count[i] specifies the number of layers in the i-th output layer set signalled in this
    syntax structure.
layer_id[i] [j] specifies the nuh_layer_id value for the j-th layer in the i-th output layer set
    signalled in this syntax structure.
is_output_layer[i] [j] equal to 1 specifies that the j-th layer is an output layer in the i-th
    output layer set signalled in this syntax structure. is_output layer[i][j] equal to 0 specifies that the
    j-th layer in not an output layer in the i-th output layer set signalled in this syntax structure.
num_operating_points: Gives the number of operating points for which the
    information follows.
ols_idx is the index to the list of output layer sets signalled in this syntax structure for the
    operating point.

TABLE 4-continued max_temporal_id: Gives the maximum TemporalId of NAL units of this operating point.
frame_rate_info_flag equal to 0 indicates that no frame rate information is present
    for the operating point. The value 1 indicates that frame rate information is present for the
    operating point.
bit_rate_info_flag equal to 0 indicates that no bitrate information is present for
    the operating point. The value 1 indicates that bitrate information is present for the
    operating point.
chroma_format_idc indicates the chroma format that applies to this operating point. The
    following constraints apply for chroma_format_idc;
    - If this operating point contains only one layer, the value of sps_chroma_format_idc, as
      defined in ISO/IEC 23090-3, shall be the same in all SPSs referenced by the VCL NAL units
      in the VVC bitstream of this operating point, and the value of chroma_format_idc
      shall be equal to that value of sps_chroma_format_idc.
    - Otherwise (this operating point contains more than one layer), the value of
      chroma_format_idc shall be equal to the value of
      vps_ols_dpb_chroma_format[MultiLayerOlsidx[output_layer_set_idx] ], as
      defined in ISO/IEC 23090-3,
bit_depth_minus8 indicates the bit depth that applies to this operating point. The following
    constraints apply for bit_depth_minus8:
    - If this operating point contains only one layer, the value of sps_bitdepth_minus8, as
      defined in ISO/IEC 23090-3, shall be the same in all SPSs referenced by the VCL NAL units
      in the VVC bitstream of this operating point, and the value of bit_depth_minus8 shall
      be equal to that value of sps_bitdepth_minus8.
    - Otherwise(this operating point contains more than one layer), the value of
      bit_depth_minus8 shall be equal to the value of
      vps_ols_dpb_bitdepth_minus8[MultiLayerOlsidx[output_layer_set_idx] ], as
      defined in ISO/IEC 23090-3.
picture_width indicates the maximum picture width, in units of luma samples, that applies to
    this operating point. The following constraints apply for picture_width;
    - If this operating point contains only one layer, the value of
      sps_pic_width_max_in_luma_samples, as defined in ISO/IEC 23090-3, shall be the same
      in all SPSs referenced by the VCL NAL units in the VVC bitstream of this operating point,
      and the value of picture_width shall be equal to that value of
      sps_pic_width_max_in_luma_samples.
    - Otherwise (this operating point contains more than one layer), the value of
      picture_width shall be equal to the value of
      vps_ols_dpb_pic_width[MultiLayerOlsidx[output_layer_set_idx] ], as defined in
      ISO/IEC.23090-3.
picture_height indicates the maximum picture height, in units of luma samples, that applies to
    this operating point. The following constraints apply for picture_height:
    - If this operating point contains only one layer, the value of
      sps_pic_height_max_in_luma samples, as defined in ISO/IEC 23090-3, shall be the same
      in all SPSs referenced by the VCL NAL units in the VVC bitstream of this operating point,
      and the value of picture_height shall be equal to that value of
      sps_pic_height_max_in_luma_samples,
    - Otherwise (this operating point contains more than one layer), the value of
      picture_height shall be equal to the value of
      vps_ols_dpb_pic_height[MultiLayerOlsidx[output_layer_set_idx] ], as defined
      in ISO/IEC 23090-3.
avgFrameRate gives the average frame rate in units of frames/(256 seconds) for the
    operating point. Value 0 indicates an unspecified average frame rate.
constantFrameRate equal to 1 indicates that the stream of the operating point is of
    constant frame rate. Value 2 indicates that the representation of each temporal layer in the
    stream of the operating point is of constant frame rate. Value 0 indicates that the stream of
    the operating point may or may not be of constant frame rate.
maxBitRate gives the maximum bit rate in bits/second of the stream of the operating point,
    over any window of one second.
avgBitRate gives the average bit rate in bits/second of the stream of the operating point.
entity_count specifies the number of tracks that are present in an operating point.
entity_idx specifies the index to the entity_id list in the entity group that belongs to
    an operating point.

For example, a media file may include decoder configuration information for an image/video content. That is, a media file may include a VVC decoder configuration record including decoder configuration information.

Meanwhile, when the VVC decoder configuration record is stored in a sample entry, the VVC decoder configuration record may include not only a parameter set, DCI, OPI and SEI NAL unit but also a size of a length field that is used for each sample in order to indicate a length of an included NAL unit. The VVC decoder configuration record may be framed from the outside (herein, a size of the VVC decoder configuration record is provided from a structure including the VVC decoder configuration record).

Additionally, the VVC decoder configuration record may include a version field. A version in the present disclosure may define Version 1 of the VVC decoder configuration record. Changes that are not compatible with the VVC decoder configuration record may be indicated as a change in the version number. If the version number is not recognized, readers should not decode the VVC decoder configuration record or a stream to which the corresponding record is applied.

Additionally, for example, compatible extensions for the VVC decoder configuration record may extend the configuration record and may not change the configuration version code. Readers should be prepared to ignore (or disregard) un-recognized data exceeding the data definition that is understood by the readers.

When a track natively (or essentially) includes a VVC bitstream or includes a VVC bitstream by resolving 'subp' track references, a VvcPtlRecord should exist in the decoder configuration record. And, in this case, a detailed output layer set for the VVC bitstream is indicated as a field output_layer_set_idx.

For example, when a ptl_present_flag in the decoder configuration record of a track is equal to 0, the track should have an 'oref' track reference for a VVC track or an ID that can reference an 'opeg' entitiy group.

Meanwhile, when a stream that is described in the VVC decoder configuration record is being decoded, values of syntax elements of VvcPTRecord, chroma_format_idc, and bit_depth_minus8 may be valid for all parameter sets that are being referenced. Most particularly, the following limitation may be applied.

A profile indication general_profile_idc indicates a profile that is conformed (or followed) by an output layer set, which is identified by an output_layer_set_idx within the configuration record.

For example, when a different provide for different CVSs of the output layer set, which is identified by an output_layer_set_idx within the configuration record, is being indicated, the stream may need to be examined in order to determine a profile (if existing) that is conformed (or followed) by the whole stream. Additionally, for example, if the whole stream cannot be examined, or if it is determined that there is no profile being followed (or conformed) by the whole stream, the whole stream is expected to be divided into two or more sub-streams having a separate configuration record to which such rule may be applied.

A tier indication general_tier_flag may indicate a tier that is the same or higher than the highest tier indicated in all profile_tier_level( ) syntax structures (in all parameter sets) conformed by an output layer set, which is identified by the output_layer_set_idx within the configuration record.

Each bit of a general_constraint_info may be configured only when the corresponding bit is configured in all general_constraints_info( ) syntax structures in all profile_tier_level( ) syntax structures (in all parameter sets) conformed by an output layer set, which is identified by the output_layer_set_idx within the configuration record.

A level indication general_level_idc indicates a level of capacity that is equal to or higher than the highest level indicated in all profile_tier_level ( ) syntax structures (in all parameter sets) conformed by an output layer set, which is identified by the output_layer_set_idx within the configuration record.

Additionally, restrictions may be applied to chroma_format_idc as described below.

When a VVC bitstream having the configuration record applied thereto is a single-layer bitstream, a value of sps_chroma_format_idc that is defined in ISO/IEC 23090-3 should be the same in all SPSs being referenced by a VCL NAL unit in a sample having the current sample entry description being applied thereto, and the chroma_format_idc value should be equal to the sps_chroma_format_idc value.

Otherwise (when the VVC bitstream having the configuration record applied thereto is a multi-layer bitstream), the value of vps_ols_dpb_chroma_format [MultiLayerOlsIdx [output_layer_set_idx]], which is defined in ISO/IEC 23090-3, should be equal for all CVSs having the current sample entry description being applied thereto, and the chroma_format_idc value should be equal to the vps_ols_dpb_chroma_format [MultiLayerOlsIdx [output_layer_set_idx]] value.

Additionally, restrictions may be applied to bit_depth_minus8 as described below.

When a VVC bitstream having the configuration record applied thereto is a single-layer bitstream, a value of sps_bitdepth_minus8 that is defined in ISO/IEC 23090-3 should be the same in all SPSs being referenced by a VCL NAL unit in a sample having the current sample entry description being applied thereto, and the bit_depth_minus8 value should be equal to the sps_bitdepth_minus8 value.

Otherwise (when the VVC bitstream having the configuration record applied thereto is the value of a multi-layer bitstream), vps_ols_dpb_bitdepth_minus8 [MultiLayerOlsIdx [output_layer_set_idx]], which is defined in ISO/IEC 23090-3, should be equal for all CVSs having the current sample entry description being applied thereto, and the bit_depth_minus8 value should be equal to the vps_ols_dpb_bitdepth_minus8 [MultiLayerOlsIdx [output_layer_set_idx]] value.

Additionally, restrictions may be applied to picture_width as described below.

When a VVC bitstream having the configuration record applied thereto is a single-layer bitstream, a value of sps_pic_width_max_in_luma_samples that is defined in ISO/IEC 23090-3 should be the same in all SPSs being referenced by a VCL NAL unit in a sample having the current sample entry description being applied thereto, and the picture_width value should be equal to the sps_pic_width_max_in_luma_samples value.

Otherwise (when the VVC bitstream having the configuration record applied thereto is a multi-layer bitstream), the value of vps_ols_dpb_pic_width [MultiLayerOlsIdx [output_layer_set_idx]], which is defined in ISO/IEC 23090-3, should be equal for all CVSs having the current sample entry description being applied thereto, and the picture_width value should be equal to the vps_ols_dpb_pic_width [MultiLayerOlsIdx [output_layer_set_idx]] value. Additionally, restrictions may be applied to picture_height as described below.

When a VVC bitstream having the configuration record applied thereto is a single-layer bitstream, a value of sps_pic_height_max_in_luma_samples that is defined in ISO/IEC 23090-3 should be the same in all SPSs being referenced by a VCL NAL unit in a sample having the current sample entry description being applied thereto, and the picture_height value should be equal to the sps_pic_height_max_in_luma_samples value.

Otherwise (when the VVC bitstream having the configuration record applied thereto is a the multi-layer bitstream), value of vps_ols_dpb_pic_height [MultiLayerOlsIdx [output_layer_set_idx]], which is defined in ISO/IEC 23090-3, should be equal for all CVSs having the current sample entry description being applied thereto, and the picture_height value should be equal to the vps_ols_dpb_pic_height [MultiLayerOlsIdx [output_layer_set_idx]] value.

Meanwhile, in addition to other important format information used in a VVC video elementary stream, explicit indication of a chroma format and a bit depth may be provided from the VVC decoder configuration record. If color space information is different in VUI information of the two sequences, two different VVC sample entries may be required.

Additionally, for example, a set of arrays delivering initialization NAL units may be included in the VVC decoder configuration record. The NAL unit types may be limited to indicate only DCI, OPI, VPS, SPS, PPS, prefix APS, and prefix SEI NAL units. The NAL unit types being reserved by ISO/IEC 23090-3 and the present disclosure may be defined in the future, and readers may be required to ignore (or disregard) arrays having reserved NAL unit type or unpermitted (or unauthorized) values.

Meanwhile, the NAL unit being delivered from a sample entry may be included immediately after AUD and OPI NAL unit (if existing). And, otherwise, the corresponding NAL unit may be included in a starting part of an access unit, which is reconstructed from a first sample that references the sample entry.

Additionally, it may be recommended that the arrays exist in an order of DCI, OPI, VPS, SPS, PPS, prefix APS, and prefix SEI.

A syntax of the above-described VvcPTLRecord and VVC decoder configuration record may be as shown below in Table 5 and Table 6.

TABLE 5

```
aligned(8) class VvcPTLRecord(num_sublayers) {
    bit(2) reserved = 0;
    unsigned int(6) num_bytes_constraint_info;
    unsigned int(7) general_profile_idc;
    unsigned int(1) general_tier_flag;
    unsigned int(8) general_level_idc;
    unsigned int(1) ptl_frame_only_constraint_flag;
    unsigned int(1) ptl_multilayer_enabled_flag;
    unsigned int(8*num_bytes_constraint_info - 2) general_constraint_info;
    for (i=num_sublayers - 2; i >= 0; i- -)
        unsigned int(1) ptl_sublayer_level_present_flag[i];
    for (j=num_sublayer; j<=8 && num_sublayers > 1; j++)
        bit(1) ptl_reserved_zero_bit = 0;
    for (i=num_sublayers-2; i >= 0; i- -)
```

TABLE 5-continued

```
        if (ptl_sublayer_level_present[i])
            unsigned int(8) sublayer_level_idc[1];
    unsigned int(8) num_sub profiles;
    for (j=0; j < num_sub_profiles, j++)
        unsigned int(32) general_sub_profile_idc[j];
}
```

TABLE 6

```
aligned(8) class VvcDecoderConfigurationRecord {
    unsigned int(8) configurationVersion = 1;
    bit(5) reserved = '11111'b;
    unsigned int(2) lengthSizeMinusOne;
    unsigned int(1) ptl_present_flag;
    if (ptl_present_flag) {
        unsigned int(16) output_layer_set_idx;
        unsigned int(16) avgFrameRate;
        unsigned int(2) constantFrameRate;
        unsigned int(3) numTemporalLayers;
        unsigned int(2) chroma_format_idc;
        unsigned int(3) bit_depth_minus8;
        bit(6) reserved = '111111'b; [Ed.(YK): Curently some reserved
bits have value 1 for each bit, and some reserved bits have value 0 for
each bit. Check whether it'd be better to have them in a consistent
manner.]
        unsigned_int(16) picture_width;
        unsigned_int(16) picture_height;
        VvcPTLRecord(numTemporalLayers) track_ptl;
    }
    unsigned int(8) numOfArrays;
    for (j=0; j < numOfArrays; j++) {
        unsigned int(1) array_completeness;
        bit(2) reserved = 0;
        unsigned int(5) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

Additionally, semantics for the syntax of the VvcPTLRecord and the VVC decoder configuration record may be as shown below in the following table.

TABLE 7 num_bytes_constraint_info used to specify the length of the
    general_constraint_info field. The length of the
    general_constraint_info field is num_bytes_constraint_info * 8 - 2
    bits. The value shall be greater than 0. The value equal to 1 indicates that the
    gci_present_flag in the general_constraint_info( ) syntax structure represented by the
    general_constraint_info field is equal to 0.
general_profile_idc, general_tier_flag, general_level_idc,
    ptl_frame_only_constraint_flag, ptl_multilayer_enabled_flag,
    general_constraint_info,      sublayer_level_present[j],
    sublayer_level_idc[i],        num_sub_profiles,     and
    general_sub_profile_idc[j] contain the matching value for the fields or syntax
    structures    general_profile_idc,    general_tier_flag,    general_level_idc,
    ptl_frame_only_constraint_flag, ptl_multilayer_enabled_flag, general_constraint _info( ),
    ptl_sublayer_level_present[i], sublayer_level_idc[i], ptl_num_sub_profiles, and
    general_sub_profile_idc[j] as defined in ISO/IEC 23090-3, for the stream to which this
    configuration record applies.
lengthSizeMinusOne plus 1 indicates the length in bytes of the NALUnitLength field
    in a VVC video stream sample in the stream to which this configuration record applies. For
    example, a size of one byte is indicated with a value of 0. The value of this field shall be
    one of 0, 1, or 3 corresponding to a length encoded with 1, 2, or 4 bytes, respectively.
ptl_present_flag_equal to 1 specifies that the track contains a VVC bitstream
    corresponding to the operating point specified by output_layer_set_idx and
    numTemporalLayers and all NAL units in the track belong to that operating point.
    ptl_present_flag equal to 0 specifies that the track may not contain a VVC bitstream
    corresponding to a specific operating point, but rather may contain a VVC bitstream
    corresponding to multiple output layer sets or may contain one or more individual layers
    that do not form an output layer set or individual sublayers excluding the sublayer with
    TemporalId equal to 0.

TABLE 7-continued output_layer_set_idx specifies the output layer set index of an output layer set
  represented by the VVC bitstream contained in the track. The value of
  output_layer_set_idx may be used as the value of the TargetOlsIdx variable
  provided by external means or by an OPI NAL unit to the VVC decoder, as specified in
  ISO/IEC 23090-3, for decoding the bitstream contained in the track
avgFrameRate gives the average frame rate in units of frames/(256 seconds), for the stream
  to which this configuration record applies. Value 0 indicates an unspecified average frame
  rate. When the track contains multiple layers and samples are reconstructed for the
  operating point specified by output_layer_set_idx and numTemporalLayers,
  this gives the average access unit rate of the bitstream of the operating point.
constantFrameRate equal to 1 indicates that the stream to which this configuration record
  applies is of constant frame rate. Value 2 indicates that the representation of each temporal
  layer in the stream is of constant frame rate. Value 0 indicates that the stream may or may
  not be of constant frame rate. When the track contains multiple layers and samples are
  reconstructed for the operating point specified by output_layer_set_idx and
  numTemporalLayers, this gives the indication of whether the bitstream of the
  operating point has constant access unit rate.
numTemporalLayers greater than 1 indicates that the track to which this configuration
  record applies is temporally scalable and the contained number of temporal layers (also
  referred to as temporal sublayer or sublayer in ISO/IEC 23090-3) is equal to
  numTemporalLayers. Value 1 indicates that the track to which this configuration record
  applies is not temporally scalable. Value 0 indicates that it is unknown whether the track
  to which this configuration record applies is temporally scalable.
chroma_format_idc indicates the chroma format that applies to this track.
bit_depth_minus8 indicates the bit depth that applies to this track.
picture_width indicates the maximum picture width, in units of luma samples, that
  applies to this track.
picture_height indicates the maximum picture height, in units of luma samples, that
  applies to this track.
track_ptl specifies the profile, tier, and level of the output layer set represented by the
  VVC bitstream contained in the track.
numArrays indicates the number of arrays of NAL units of the indicated type(s).
array_completeness when equal to 1 indicates that all NAL units of the given type are
  in the following array and none are in the stream; when equal to 0 indicates that additional
  NAL unit of the indicated type may be in the stream; the permitted values are constrained
  by the sample entry name.
NAL_unit_type indicates the type of the NAL units in the following array (which shall be
  all of that type); it takes a value as defined in ISO/IEC 23090-3; it is restricted to take one
  of the values indicating a DCI, OPI, VPS, SPS, PPS, prefix APS or prefix SEI NAL unit.
numNalus indicates the number of NAL units of the indicated type included in the
  configuration record for the stream to which this configuration record applies. The SEI
  array shall only contain SEI messages of a 'declarative' nature, that is, those that provide
  information about the stream as a whole. An example of such an SEI could be a user-data
  SEI.
nalUnitLength indicates the length in bytes of the NAL unit,
nalUnit contains a DCI, OPI, VPS, SPS, PPS, APS or declarative SEI NAL unit, as specified in
  ISO/IEC 23090-3.

Meanwhile, a VVC file format defines various types of tracks as described below.

a) VVC track: a VVC track may represent a VVC bitstream, if possible, by including a NAL unit in a sample and sample entry of a VVC track, if possible, by referencing other VVC tracks including other sublayers the VVC bitstream, or, if possible, by referencing VVC subpicture tracks.

b) VVC non-VCL track: APSs, which carry ALF, LMCS, or scaling list parameters, and other non-VCL NAL units can be stored in and transmitted through a track that is separate from the track containing the VCL NAL units; this is the VVC non-VCL track.

c) VVC subpicture track: A VVC subpicture track may include either of the following:
  a sequence of one or more VVC subpictures
  one or more complete slice sequences forming a rectangular area.

Meanwhile, a sample of a VVC subpicture track may include one of the following:
  one or more complete subpictures being defined in ISO/IEC 23090-3 and being contiguous in a decoding order
  one or more complete subpictures being defined in ISO/IEC 23090-3, forming a rectangular area, and being contiguous in a decoding order.

Meanwhile, VVC subpictures or slices being included in any sample of a VVC subpicture track may be contiguous in the decoding order.

For example, VVC non-VCL tracks and VVC subpicture tracks may allow optimal delivery of VVC video to be carried out in a streaming application as described below. For example, the corresponding tracks may each be transported (or delivered) as a DASH representation of its own. And, for the decoding and rendering of a track subset, in addition to the DASH representation including a non-VCL track, a DASH representation including a subset of the VVC subpicture track may be requested by clients for each segment. By using this method, redundant transmission of APS and other non-VCL NAL units may be prevented.

Meanwhile, in order to reconstruct an access unit from samples of multiple tracks delivering a multilayer VVC bitstream, an operating point may first be determined.

For example, when a VVC bitstream is represented as multiple VVC tracks, a file parser may identify tracks that are needed for operating points, which are selected as follows.

A VVC bitstream is selected based on an 'opeg' entity group, as well as a 'vvcb' entity group and a corresponding 'vopi' sample group.

An operating point that is appropriate for the decoding capacity and application purposes is selected from an 'opeg' entity group or 'vopi' sample group.

In case an 'opeg' entity group exists, a set of tracks accurately indicating the selected operating points may be indicated. Therefore, a VVC bitstream may be reconstructed from the set of tracks and may be decoded.

In case the 'opeg' entity group does not exist (i.e., in case a 'vopi' sample group exists), a set of tracks that is needed for decoding the selected operating points may be determined from a 'vvcb' entity group and a 'vopi' sample group.

For example, in order to reconstruct a bitstream from multiple VVC tracks delivering a VVC bitstream, a target highest (or maximum) value of the TemporalId may need to be determined first.

For example, in case the plurality of tracks include data for an access unit, the alignment (or array) of each of the samples in the tracks may be performed based on sample decoding times. That is, a time-to-sample table may be used without considering edit lists.

For example, when the VVC bitstream is represented as multiple VVC tracks, if the tracks are combined into a single stream by increasing the decoding time, the decoding time of the samples may need to have an accurate access unit order as given in ISO/IEC 23090-3.

A sequence of access units may be reconstructed from each sample of the tracks that are required according to the implicit reconstruction process, which will hereinafter be described.

Meanwhile, the implicit reconstruction process of a VVC bitstream may be as described below.

For example, when an Operating Point Information sample group exists, required tracks may be selected based on layers delivered by the tracks and their reference layers that are indicated in the Operating Point Information and layer information sample group.

Additionally, for example, when an Operating Point Entity Group exists, required tracks may be selected based on information of an OperatingPointGroupBox.

Additionally, for example, when a VCL NAL unit reconstructs a bitstream including a sublayer having a TemporalId that is greater than 0, all lower-level sublayers (i.e., sublayers having VCL NAL units with lower TemporalId values) within the same layer may be included in a resulting bitstream, and the required tracks may be selected accordingly.

Additionally, for example, when an access unit is reconstructed, picture units (defined in ISO/IEC 23090-3) may be assigned to access units according to an increasing order of nuh_layer_id values from samples having the same decoding time.

Additionally, for example, among multiple pictures for an access unit, when at least one picture has an AUD NAL unit, a first picture unit (i.e., a picture unit having the smallest nuh_layer_id value) should have the AUD NAL unit. Herein, only the AUD NAL unit in the first picture unit is kept (or maintained) in the reconstructed access unit, whereas the other AUD NAL units, if existing, may be discarded. In the reconstructed access unit, an AUD NAL unit has an aud_irap_or_gdr_flag that is equal to 1, and, if the reconstructed access unit is not an IRAP or GDR access unit, the value of the aud_irap_or_gdr_flag of the AUD NAL unit is set to be equal to 0.

An AUD NAL unit of a first PU may have an aud_irap_or_gdr_flag that is equal to 1, and another PU corresponding to the same access unit but existing in a separate track may have a picture that is not an IRAP or GDR picture. In this case, the value of the aud_irap_or_gdr_flag of the AUD NAL unit existing in the reconstructed access unit may be changed from 1 to 0.

Additionally, for example, when an operating point entity group does not exist, selection may be made from tracks delivering the same layer or sublayer. Thereafter, a final required track may collectively deliver part of the layers or sublayers that to do not belong to a target operating point. Although a bitstream that is reconstructed for a target operating is delivered from a track, which is finally requested, the corresponding bitstream should not include a layer or sublayer that does not belong to the target operating point.

VVC decoder implementations use a bitstream corresponding to a target output layer set index and a highest TemporalId value of a target operating point each corresponding to TargetOlsIdX and HighestTid parameters, which are specified in ISO/IEC 23090-3 Section 8. A file parser should verify whether a reconstructed bitstream includes any other layer and sublayer, apart from the layer or sublayer included in the target operation point, before sending the reconstructed bitstream to a VVC decoder.

For example, when an access unit is reconstructed by using dependent layers and a max_tid_il_ref_pics_plus1 is greater than 0, only sublayers of reference layers for a VCL NAL unit having a TemporalId value that is less than or equal to max_tid_il_ref_pics_plus1-1 (indicated in the operating point information sample group) within the same layer may also be included in the resulting bitstream, and a required track may be selected accordingly.

Additionally, for example, when an access unit is reconstructed to dependent layers, and when max_tid_il_ref_pics_plus1 is equal to 0, among all picture units of reference layers, only an IRAP picture unit and a GDR picture unit having a ph_recovery_poc_cnt that is equal to 0 may be included in the resulting bitstream, and only the tracks that are requested accordingly may be selected.

For example, when a VVC track includes a 'subp' track reference, each picture unit may be reconstructed as given in Section 11.6.3 of ISO/IEC 23090-3 along with additional restrictions (or limitations) on EOS and EOB NAL units, which are given below. The process described in Section 11.6.3 of ISO/IEC 23090-3 may be repeated for each layer of a target operating point according to an increasing order of the nuh_layer_id. Otherwise, each picture unit may be reconstructed as described below.

Reconstructed access units may be assigned to a VVC bitstream according to an increasing order of the decoding time, and, as additionally described below, duplicates of end of bitstream (EOB) and end of sequence (EOS) NAL units may be removed from the VVC bitstream.

For example, for access units existing in a same coded video sequence of the VVC bitstream and belonging to different sublayers stored in multiple tracks, one or more tracks may exist, wherein the one or more tracks include an EOS NAL unit having a specific nuh_layer_id in each of the samples. In this case, only one of the EOS NAL units may be maintained in a last access unit (the unit having the greatest decoding time), among the access units, in the final reconstructed bitstream, and only one EOS NAL unit may be assigned behind all NAL units excluding the EOB NAL unit (if existing) of the last access unit, among the access units, and other EOS NAL units may be discarded (or deleted). Similarly, one or more tracks including an EOB NAL unit may exist in each sample. In this case, among the EOB NAL units, only one EOB NAL unit may be maintained in the final reconstructed bitstream and may be assigned to a last end of such access units, and other EOB NAL units may be discarded (or deleted).

Additionally, for example, since a specific layer or sublayer may be represented as one or more tracks, when determining the tracks that are needed for an operating point, the tracks may need to be selected from a set of tracks delivering all of the specific layers or sublayers.

Meanwhile, a picture unit may be reconstructed from a sample of a VVC track that references a VVC subpicture track.

For example, a sample of the VVC track may be resolved as a picture unit included a NAL unit, which will be described later on according to the following order.

If a sample exists, an AUD NAL unit.
For example, if an AUD NAL unit exists in a sample, a first NAL unit within the sample.

If the sample is a first sample of a sequence of samples being related to the same sample entry, a parameter set and SEI NAL unit (if existing) included in the sample entry.

If at least one NAL unit having the nal_unit_type of EOS_NUT, EOB_NUT, SUFFIX_APS_NUT, SUFFIX_SEI_NUT, FD_NUT, RSV_NVCL_27, UNSPEC_30, or UNSPEC_31 (a NAL unit having such a NAL unit type cannot be placed before a first VCL NAL unit within a picture unit) exists within a sample, among such NAL units, NAL units within a sample excluding a first unit, and, otherwise, all NAL units within the sample.

Content that is resolved (within a decoding time) and time-aligned in each reference VVC subpicture track according to an order of VVC subpicture tracks that are referenced by a 'subp' track reference (when a num_subpic_ref_idx within a same group entry of a 'spor' sample group entry being mapped to this sample is equal to 0). Alternatively, content (if existing) that is resolved (within a decoding time) and time-aligned in each referenced VVC subpicture track in an order that is designated by a 'spor' sample group description entry, which is mapped to this sample, excluding all DCI, OPI, VPS, SPS, PPS, AUD, PH, EOS, EOB, and other AU-level or picture-level non-VCL NAL units. The track reference is resolved as given in the description that follows.

For example, if a referenced VVC subpicture track is related to a VVC non-VCL track, a resolved sample of the VVC subpicture track includes a non-VCL NAL unit (if existing) of a time-aligned sample existing in a VVC non-VCL track.

All NAL units having a nal_unit_type of EOS_NUT, EOB_NUT, SUFFIX_APS_NUT, SUFFIX_SEI_NUT, FD_NUT, RSV_NVCL_27, UNSPEC_30, or UNSPEC_31.

Meanwhile, if a num_subpic_ref_idx of a 'spor' sample group description entry that is mapped to this sample is equal to 0, each track reference existing in a 'subp' box may be resolved as described below. Otherwise, each instance of a track reference subp_track_ref_idx existing in the 'spor' sample group description entry that is mapped to this sample may be resolved as described below.

If the track reference indicates a track ID of a VVC subpicture track, the track reference may be resolved to a VVC subpicture track.

Otherwise (when the track reference indicates an 'alte' track group), the track reference may be resolved to any one track of the 'alte' track group. At this point, when a track reference index value is resolved for a specific track existing in a previous sample, the corresponding value should be resolved to one of the following in a current sample.

For example, the track reference may be resolved to the same specific track.

Alternatively, the track reference may be resolved to any other track within the same 'alte' track group including a sync sample that is time-aligned with the current sample.

In order to avoid decoding mismatch from occurring, since the VVC subpicture tracks in the same 'alte' track group need to be independent from any other VVC subpicture track being referenced by the same VVC base track, the VVC subpicture tracks may be restricted as follows.

For example, all VVC subpicture tracks include VVC subpictures.

Additionally, for example, subpicture boundaries are the same as picture boundaries.

Meanwhile, each sample of the VVC base track that is resolved in the 'subp' track reference may configure a rectangular region (or area) with no holes or overlaps. A rectangular area having no holes denotes that all samples of the rectangular area should be covered. The overlap means that all samples of the rectangular area should be covered only once.

Meanwhile, when a reader makes an initial selection, or when the user selects VVC subpicture tracks including a VVC subpicture having a set of subpicture ID values that are different from a previous selection, the following steps may be performed.

In order to determine whether a PPS or SPS NAL unit needs to be changed, a 'spor' sample group description entry may be studied.

When the 'spor' sample group description entry indicates that start code emulation prevention bytes exist within or before subpicture IDs including a NAL unit, RBSP may be derived from the NAL unit (i.e., the start code emulation prevention bytes are removed). After overriding is performed in the next phase, start code emulation prevention may be performed once again.

The reader may use subpicture ID length information and bit position within the 'spor' sample group entry to determine which bits are being overwritten in order to update the subpicture ID.

When the subpicture ID value of the PPS or SPS is initially selected, the reader may need to rewrite each PPS or SPS with the subpicture ID value that has been selected in a reconstructed access unit.

When the subpicture ID value of the PPS or SPS is changed after comparing (each of) the same PPS ID value or SPS ID value and (each of) the previous PPS ID value or SPS ID value, the reader need to include copies of the previous PPS and SPS (when each of a PPS or SPS having the same PPS or SPS ID value does not exist in the access unit), and (each of) the PPS and SPS may need to be rewritten to the subpicture ID values that are updated in the reconstructed access unit.

When a 'minp' sample group description entry that is mapped to a sample of a VVC base track exists, the following operations may be applied.

A 'minp' sample group description entry may be studied in order to determine a value of a pps_mixed_nalu_types_in_pic_flag.

If the corresponding value is different from a value within a previous PPS NAL unit having the same PPS ID within the reconstructed bitstream, the following may be applied.

For example, if a PPS is not included in a picture unit by the above-described steps, the reader may need to include a copy of the PPS having a pps_mixed_nalu_types_in_pic_flag value, which is updated within the reconstructed picture unit.

Additionally, for example, the reader uses a bit position within the 'minp' sample group description entry to determine which bit is overwritten in order to update the pps_mixed_nalu_types_in_pic_flag.

Meanwhile, a stream access point (SAP) sample group 'sap', which is defined in ISO/IEC 14496-12, is used for providing information on all SAPs.

For example, semantics of a layer_id_method_idc that is equal to 0 is defined in ISO/IEC 14496-12. For example, if Layer_id_method_idc is equal to 0, the SAP may be interpreted as described below.

If the sample entry type is 'vvc1' or 'vvi1', and if the track does not include a sublayer having a TemporalId of 0, the SAP designates access of all sublayers existing in the track.

Otherwise, the SAP designates access for all layers existing in the track.

For example, if the sample entry type is 'vvc1' or 'vvi1', and if the track does not include any sublayer having a TemporalId of 0, an STSA picture having the same TemporalId as the lowest TemporalId in the track performed the role of an SAP.

A GDR picture of a VVC bitstream is generally indicated as an SAP type-4 in a 'sap' sample group.

For example, VVC enables a sublayer having a different VCL_NAL unit type to be within the same coded picture. Gradual decoding refresh may be gained by updating subpictures of each subpicture index within a picture range to an IRAP subpicture. However, the VVC does not designate a decoding process that starts from a picture having a mixed VCL NAL unit type.

Meanwhile, if all of the following is true,
a sample of a VVC track references a PPS having a pps_mixed_nalu_types_in_pic_flag that is equal to 1,
for each subpicture index i within a range from 0 to sps_num_subpics_minus1 (inclusive), both of the following are true:
sps_subpic_treated_as_pic_flag[i] is equal to 1, and
at least one IRAP subpicture having the same subpicture index i exists, or at least one IRAP subpicture exists following the current sample of the same CLVS.
The following is applied.
A sample may be indicated as a type-4 SAP sample.
And, a sample may be mapped to a 'roll' sample group description entry. At this point, the 'roll' sample group description entry may have a correct roll_distance value for a decoding process that skips the decoding of subpictures having specific subpicture indices prior to the existence of an IRAP subpicture.

Additionally, if an SAP sample group is being used, the SAP sample group should be used in all tracks delivering the same VVC bitstream.

Meanwhile, a random access recovery point sample group 'roll', which is defined in ISO/IEC 14496-12, is used for providing information on recovery points for gradual decoding refresh.

For example, if a 'roll' sample group is used along with a VVC track, syntax and semantics of a grouping_type parameter may be defined to be the same as that of the 'sap' sample group of ISO/IEC 14496-12.

For example, the values of 0 and 1 for layer_id_method_idc are used when a picture of a target layer of a sample that is being mapped to a 'roll' sample group is a GDR picture.

For example, when the layer_id_method_idc is equal to 0, the 'roll' sample group designates behaviors of all layers existing in the track.

Semantics of the layer_id_method_idc being equal to 1 are defined in Section 9.5.7.

For example, when the layer_id_method_idc is equal to 2 and 3, the layer_id_method_idc is used when none of pictures of the target layer of the sample that is mapped to the 'roll' sample group is a GDR picture. And, for pictures of the target layer that are not GDR pictures, the following is applied:
a referenced PPS has a pps_mixed_nalu_types_in_pic_flag that is equal to 1,
for each subpicture index i within a range from 0 to sps_num_subpics_minus1 (inclusive), both of the following are true:
sps_subpic_treated_as_pic_flag[i] is equal to 1, and
at least one IRAP subpicture having the same subpicture index i exists, or at least one IRAP subpicture exists following the current sample of the same CLVS.

For example, when the layer_id_method_idc is equal to 2, the 'roll' sample group designates behaviors of all layers existing in the track.

For example, semantics of the layer_id_method_idc being equal to 3 are defined in Section 9.5.7.

For example, when the reader uses a sample marked with a layer_id_method_idc being equal to 2 and 3 to start decoding, in order to allow the bitstream, which starts with the sample that is marked as belonging to the sample group having the values of the layer_id_method_idc that are equal to 2 and 3, to become a conforming bitstream, the reader may need to correct (or modify) SPS, PPS, and PH NAL units of the bitstream, which was reconstructed according to Section 11.6.

Any SPS being referenced by the sample has an sps_gdr_enabled_flag that is equal to 1.

Any PPS being referenced by the sample has a pps_mixed_nalu_types_in_pic_flag that is equal to 0.

All VCL NAL units of an AU that is reconstructed from the sample have the same nal_unit_type as the GDR_NUT.

Any picture header of an AU that is reconstructed from the sample has a ph_gdr_pic_flag that is equal to 1 and has a ph_recovery_poc_cnt value corresponding to a roll_distance of a 'roll' sample group description entry having a sample mapped thereto.

Additionally, although the 'roll' sample group is concerned (or related) with a dependent layer, unless the layer is a reference layer of the 'roll' sample group, the sample group may indicate characteristics that are applied when all reference layers of the dependent layer are usable and decoded. Additionally, the sample group may be used for starting the decoding of a predicted layer.

Meanwhile, in the prior art, the operating point information may be signaled from an entity group 'opeg', a sample group 'vopi', or a sample entry of a track. Also, the following is applied.

When a track does not natively include a VVC bitstream, and when the track does not indicate a VVC bitstream after resolving 'subp' and 'vvcN' track references (if existing), the track should include an 'oref' track reference for a track delivering a 'vopi' sample group or an Operating Point Entity Group.

As described above, the presence of an 'oref' track reference is made mandatory because the 'opeg' and 'vopi' are duplicated for being provided from a meta box of a file lever. A file parser parsed within information first before parsing any other information in the track level. Instead of using the above-described constraints, it is more useful to designate constraints that prevent any orphan track.

Furthermore, even if such track reference has the advantage of indicating the 'opeg' or 'vopi', there is no method of differentiating the reference as a reference for an 'opeg' or as a reference for a 'vopi'.

Thus, the present specification proposes a solution to the above-described problem. The proposed embodiments may be applied individually or in combination.

For example, when a track does not natively include a VVC bitstream, and when the track does not indicate a VVC bitstream after resolving 'subp' and 'vvcN' track references (if existing), the track should be included in at least one of the operating points listed in 'opeg' and 'vopi'.

An 'oref' track reference is no longer used.

Additionally, for example, as a solution, in order to differentiate a track reference for 'oref' and a track reference for 'vopi', a new track reference type is used. This may be represented as described below.

For example, when a track does not natively include a VVC bitstream, and when the track does not indicate a VVC bitstream after resolving 'subp' and 'vvcN' track references (if existing), one of the following is applied.

A track includes an 'oref' track reference for an 'opeg' operating point entity group.

A track includes a 'vref' track reference for a track delivering a 'vopi' sample group.

Additionally, for example, as another solution, in order to differentiate a track reference for 'oref' and a track reference for 'vopi', a new track reference type is used. This may be represented as described below.

For example, when a track does not natively include a VVC bitstream, and when the track does not indicate a VVC bitstream after resolving 'subp' and 'vvcN' track references (if existing), at least one of the following is applied.

A track includes an 'oref' track reference for an 'opeg' operating point entity group.

A track includes a 'vref' track reference for a track delivering a 'vopi' sample group.

For example, when a track does not natively include a VVC bitstream, and when the track does not indicate a VVC bitstream after resolving 'subp' and 'vvcN' track references (if existing), the track should be included in at least one of the operating points listed in 'opeg' and 'vopi'.

For example, when a track does not natively include a VVC bitstream, and when the track does not indicate a VVC bitstream after resolving 'subp' and 'vvcN' track references (if existing), one of the following is applied.

A track includes an 'oref' track reference for an 'opeg' operating point entity group.

A track includes a 'vref' track reference for a track delivering a 'vopi' sample group.

For example, when a track does not natively include a VVC bitstream, and when the track does not indicate a VVC bitstream after resolving 'subp' and 'vvcN' track references (if existing), at least one of the following is applied.

A track includes an 'oref' track reference for an 'opeg' operating point entity group.

A track includes a 'vref' track reference for a track delivering a 'vopi' sample group.

Figure 8:
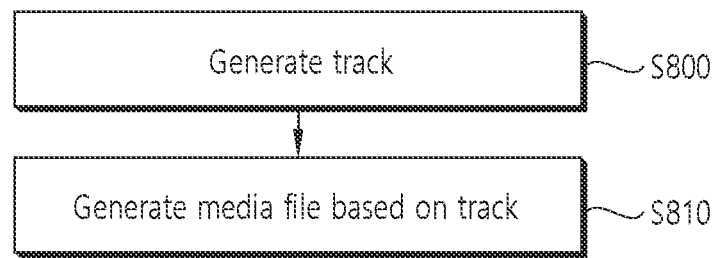
FIG. 8 exemplarily illustrates a method for generating a media file to which an embodiment proposed in the present disclosure is applied.

FIG. 8 exemplarily illustrates a method for generating a media file to which an embodiment proposed in the present disclosure is applied.

Referring to FIG. 8, a first device may generate a track (S800). For example, the first device may configure a track according to the above-described embodiment. For example, the first device may represent a transmission end, an encoding end, or a media file generating end. Additionally, for example, the track may include a first track reference. Additionally, for example, the track may include a second track reference. And, the first device may include an encoder.

The first device may generate a media file based on a track (S810). For example, the first device may generate a media file based on a track according to the above-described embodiment.

Figure 9:
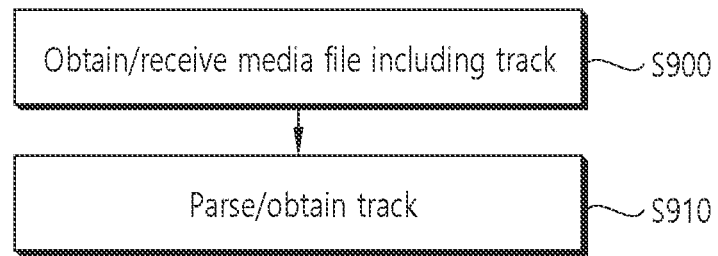
FIG. 9 exemplarily illustrates a method for decoding a media file generated by applying the embodiment proposed in the present disclosure.

FIG. 9 exemplarily illustrates a method for decoding a media file generated by applying the embodiment proposed in the present disclosure.

Referring to FIG. 9, a second device may obtain/receive a media file including a track (S900). For example, the second device may obtain/receive a media file including a track according to the above-described embodiment. Additionally, for example, the second device may represent a reception end, a decoding end, or a rendering end.

For example, a media file may include information described in Table 1 and/or Table 3.

The second device may parse/obtain the track (S910). For example, the second device may parse/obtain a track that is included in the media file. Additionally, for example, the track may include a first track reference. Additionally, for example, the track may include a second track reference.

Figure 10:
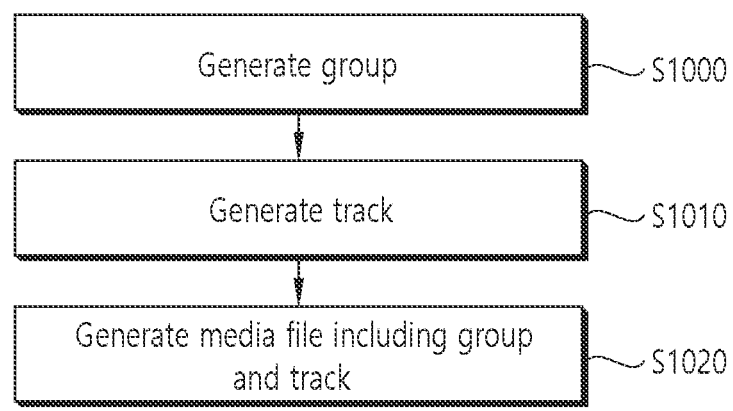
FIG. 10 schematically illustrates a method for generating a media file by an apparatus for generating a media file according to the present disclosure.

FIG. 10 schematically illustrates a method for generating a media file by an apparatus for generating a media file according to the present disclosure. The method disclosed in FIG. 10 may be performed by an apparatus for generating a media file (or a media file generating apparatus), which is disclosed in FIG. 11. The media file generating apparatus may represent the above-described first device. More specifically, for example, S1000 to S1010 of FIG. 10 may be performed by an image processor of the media file generating apparatus, and S1020 may be performed by a media file generator of the media file generating apparatus. Additionally, although it is not shown in the drawing, a process of encoding a bitstream, which includes image information, may be performed by an encoder of the media file generating apparatus. The encoder may be included in the media file generating apparatus or may be configured as an external component.

The media file generating apparatus configures a group (S1000).

For example, the media file generating apparatus may configure at least one of an entity group or a sample group. Additionally, for example, the entity group may include an operating point entity group. Additionally, for example, the sample group may include an operating point information sample group.

For example, in the present specification, an operating point entity group may also be referred to as an operating points entity group. Additionally, for example, an operating point information sample group may also be referred to as an operating points information sample group.

The media file generating apparatus generates a track (S1010). For example, the media file generating apparatus may generate a track. For example, the track may include a first track reference. Additionally, for example, the track may include a second track reference.

For example, based on the track not including a VVC bitstream, the track may have one of a first track reference for the operating point entity group or a second track reference for a specific track that contains the operating point information sample group.

For example, the operating point entity group included in the media file may be an 'opeg' entity group. Additionally, for example, the operating point information sample group included in the media file may be a 'vopi' sample group.

For example, the track may have the second track reference being a 'vref' track reference, and the track may have the second track reference for the specific track that contains the operating point information sample group.

For example, among specific track references, based on the track not indicating the VVC bitstream after resolving at least one of specific track references, the track may have one of a first track reference for the operating point entity group and a second track reference for the specific track that contains the operating point information sample group. At this point, the specific track references may include 'subp' and 'vvcN' track references. Additionally, for example, the track may have the second track reference being a 'vref' track reference, and the track may have the second track reference for the specific track that contains the operating point information sample group.

For example, based on the track not including the VVC bitstream, the track may have one of a first track reference for the operating point entity group or a second track reference for the specific track that contains the operating point information sample group. Additionally, for example, the track may have the second track reference being a 'vref' track reference, and the track may have the second track reference for the specific track that contains the operating point information sample group.

For example, based on the track not indicating the VVC bitstream after resolving at least one of specific track references, the track may have one of the first track reference for the operating point entity group and the second track reference for the specific track that contains the operating point information sample group. At this point, the specific track references may include 'subp' and 'vvcN' track references.

For example, based on the track not including the VVC bitstream, the track may be included in at least one of the operating points being listed in an operating point entity group or operating point information sample group. Additionally, for example, the operating point entity group may be an 'opeg' entity group. Additionally, for example, the operating point information sample group may be a 'vopi' sample group. At this point, usage of an 'oref' track reference may no longer be used.

For example, based on the track not indicating the VVC bitstream after resolving at least one of specific track references, the track may be included in at least one of the operating points being listed in an operating point entity group or operating point information sample group. At this point, the specific track references may include 'subp' and 'vvcN' track references. At this point, usage of an 'oref' track reference may no longer be used.

The media file generating apparatus generates a media file including a group and a track (S1020). The media file generating apparatus may generate a media file including a group and a track. For example, the media file generating apparatus may configure at least one of an entity group or a sample group. Additionally, for example, the entity group may include an operating point entity group. Additionally, for example, the sample group may include an operating point information sample group.

Although the methods disclosed in FIG. 10 are described based on a flowchart showing a series of steps or blocks, the present specification will not be limited to the order of steps. Herein, certain steps may be performed in an order or step that is different from the description provided above, or may be performed concurrently with another step. That is, in other words, steps S1000 and S1010 may occur in a different order than the above-described method, each step may be implemented separately or may be implemented concurrently.

Meanwhile, although it is not shown in the drawing, the media file generating device may store the generated media file in a (digital) storage medium or may deliver the generated media file to a media file processing device through a network or a (digital) storage medium. Herein, a network may include a broadcasting network and/or a communication network, and a digital storage medium may include various storage media, such as USB, SD, CD, DVD, Blu-ray, HDD, SSD, and so on.

Figure 11:
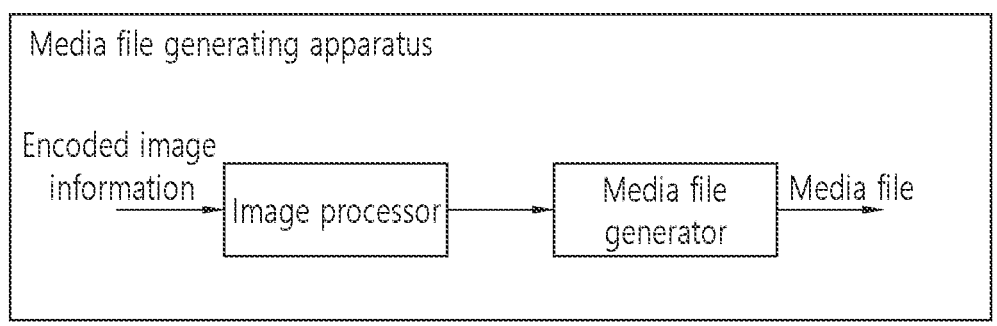
FIG. 11 schematically illustrates an apparatus for generating a media file, which performs a method for generating a media file according to the present disclosure.

FIG. 11 schematically illustrates an apparatus for generating a media file, which performs a method for generating a media file according to the present disclosure. The method disclosed in FIG. 10 may be performed by an apparatus for generating a media file (or a media file generating apparatus), which is disclosed in FIG. 11. More specifically, for example, an image processor of the media file generating apparatus of FIG. 11 may perform S1000 to S1010 of FIG. 10, and a media file generator of the media file generating apparatus of FIG. 11 may perform S1020. Additionally, although it is not shown in the drawing, a process of encoding a bitstream, which includes image information may be performed by an encoder of the media file generating apparatus.

Figure 12:
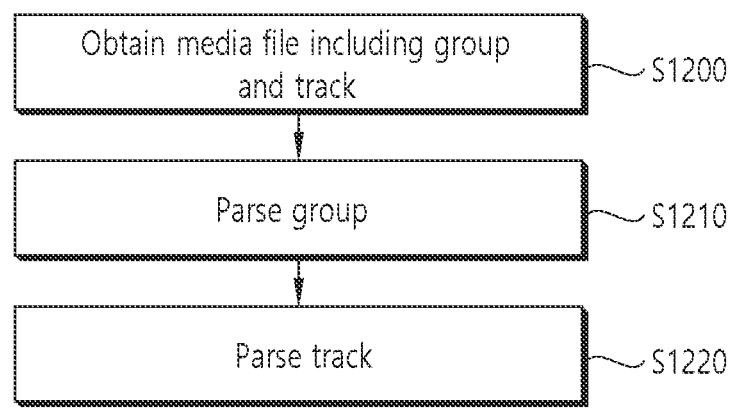
FIG. 12 schematically illustrates a method for processing a media file by an apparatus for processing a media file according to the present disclosure.

FIG. 12 schematically illustrates a method for processing a media file by an apparatus for processing a media file according to the present disclosure. The method disclosed in FIG. 12 may be performed by an apparatus for processing a media file (or a media file processing apparatus), which is disclosed in FIG. 13. The media file processing apparatus may represent the above-described second device. More specifically, for example, S1200 of FIG. 12 may be performed by a receiver of the media file processing apparatus, and S1210 and S1220 may be performed by a media file processor of the media file processing apparatus. Additionally, although it is not shown in the drawing, a process of decoding a bitstream based on a decoder configuration record may be performed by an encoder of the media file processing apparatus.

The media file processing apparatus obtains a media file including a group and a track (S1200). For example, the media file processing device may obtain the media file including the subpicture track and the base track through a network or (digital) storage medium. Herein, a network may include a broadcasting network and/or a communication network, and a digital storage medium may include various storage media, such as USB, SD, CD, DVD, Blu-ray, HDD, SSD, and so on.

The media file processing apparatus parses a group (S1210). For example, the media file processing apparatus parses/obtains a group. For example, the media file processing apparatus parses/obtains at least one of an entity group or a sample group. Additionally, for example, the entity group may include an operating point entity group. Additionally, for example, the sample group may include an operating point information sample group.

For example, an operating point entity group may also be referred to as an operating points entity group. Additionally, for example, an operating point information sample group may also be referred to as an operating points information sample group.

The media file processing apparatus parses a track (S1220). For example, the media file processing apparatus may parse/obtain a track. For example, the track may include a first track reference. Additionally, for example, the track may include a second track reference.

For example, based on the track not including a VVC bitstream, the track may have one of a first track reference for the operating point entity group or a second track reference for a specific track that contains the operating point information sample group.

For example, the operating point entity group included in the media file may be an 'opeg' entity group. Additionally, for example, the operating point information sample group included in the media file may be a 'vopi' sample group.

For example, the track may have the second track reference being a 'vref' track reference, and the track may have the second track reference for the specific track that contains the operating point information sample group.

For example, among specific track references, based on the track not indicating the VVC bitstream after resolving at least one of specific track references, the track may have one of a first track reference for the operating point entity group and a second track reference for the specific track that contains the operating point information sample group. At this point, the specific track references may include 'subp' and 'vvcN' track references. Additionally, for example, the track may have the second track reference being a 'vref' track reference, and the track may have the second track reference for the specific track that contains the operating point information sample group.

For example, based on the track not including the VVC bitstream, the track may have one of a first track reference for the operating point entity group or a second track reference for the specific track that contains the operating point information sample group. Additionally, for example, the track may have the second track reference being a 'vref' track reference, and the track may have the second track reference for the specific track that contains the operating point information sample group.

For example, based on the track not indicating the VVC bitstream after resolving at least one of specific track references, the track may have one of the first track reference for the operating point entity group and the second track reference for the specific track that contains the operating point information sample group. At this point, the specific track references may include 'subp' and 'vvcN' track references.

For example, based on the track not including the VVC bitstream, the track may be included in at least one of the operating points being listed in an operating point entity group or operating point information sample group. Additionally, for example, the operating point entity group may be an 'opeg' entity group. Additionally, for example, the operating point information sample group may be a 'vopi' sample group. At this point, usage of an 'oref' track reference may no longer be used.

For example, based on the track not indicating the VVC bitstream after resolving at least one of specific track references, the track may be included in at least one of the operating points being listed in an operating point entity group or operating point information sample group. At this point, the specific track references may include 'subp' and 'vvcN' track references. At this point, usage of an 'oref' track reference may no longer be used.

Although the methods disclosed in FIG. 12 are described based on a flowchart showing a series of steps or blocks, the present specification will not be limited to the order of steps. Herein, certain steps may be performed in an order or step that is different from the description provided above, or may be performed concurrently with another step. That is, in other words, steps S1210 and S1220 may occur in a different order than the above-described method, each step may be implemented separately or may be implemented concurrently.

Meanwhile, although it is not shown in the drawing, the media file processing apparatus may decode a bitstream based on the entity group, the sample group, and the track. For example, the media file processing apparatus may decode image information included in the bitstream for the track based on the entity group, the sample group, and the track and may generate reconstructed samples based on the image information.

Figure 13:
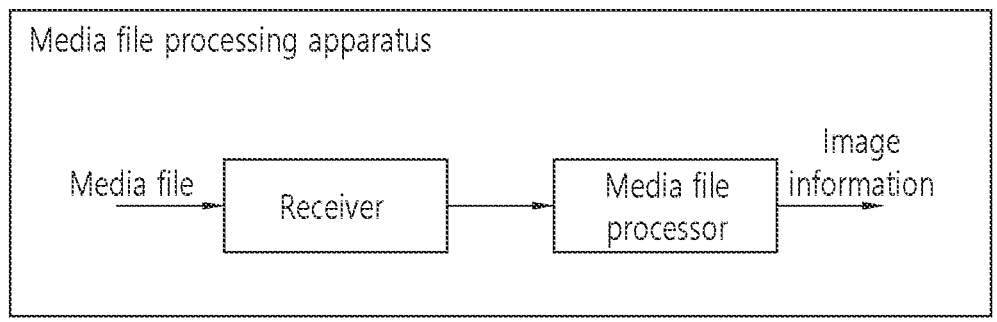
FIG. 13 schematically illustrates an apparatus for processing a media file, which performs a method for processing a media file according to the present disclosure.

FIG. 13 schematically illustrates an apparatus for processing a media file, which performs a method for processing a media file according to the present disclosure. The method disclosed in FIG. 12 may be performed by an apparatus for processing a media file (or a media file processing apparatus), which is disclosed in FIG. 13. More specifically, for example, a receiver of the device for processing a media file of FIG. 13 may perform S1200 of FIG. 12, and a media file processor of the media file processing apparatus of FIG. 13 may perform S1210 and S1220 of FIG. 12. Meanwhile, although it is not shown in the drawing, the media file processing apparatus may include a decoder, and the decoder may decode a bitstream based on an entity group, a sample group, and a track.

According to the above-described specification, an entity group includes an operating point entity group, a sample group includes an operating point information sample group. And, based on the track not including a versatile video coding (VVC) bitstream, the track has one of a first track reference for the operating point entity group or a second track reference for a specific track that contains the operating point information sample group, and the first track reference is different from the second track reference. By differentiating track references according to the operating point entity group or operating point information sample group and signaling information in the operating points, complexity in file transport (or delivery) may be reduced, and overall coding efficiency may be enhanced.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a virtual reality (VR) apparatus, an augmented reality (AR) apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 14:
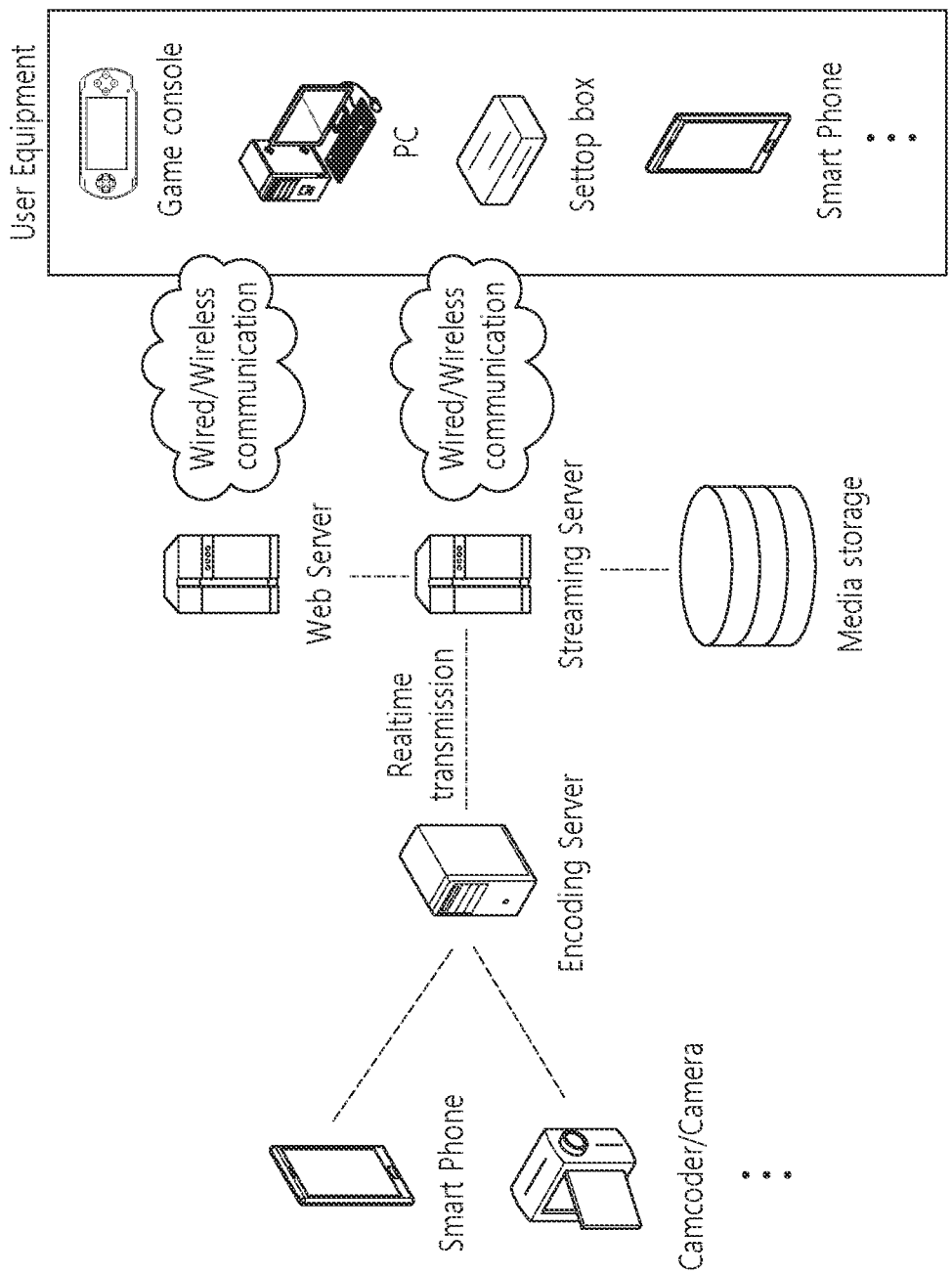
FIG. 14 illustrates a structural diagram of a contents streaming system to which the present disclosure is applied.

FIG. 14 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. A method for generating a media file, the method comprising:
configuring at least one of an entity group or a sample group;
generating a track; and
generating the media file comprising the track and at least one of the entity group or the sample group,
wherein the entity group includes an operating point entity group,
wherein the sample group includes an operating point information sample group,
wherein based on the track not including a versatile video coding (VVC) bitstream, the track has one of a first track reference for the operating point entity group or a second track reference for a specific track that contains the operating point information sample group, and
wherein the first track reference is different from the second track reference.

2. The method of claim 1, wherein the operating point entity group is an 'opeg (operating point entity group)' entity group, and wherein the operating point information sample group is a 'vopi (operating point information sample group)' sample group.

3. The method of claim 1, wherein the track has the second track reference being a 'vref' track reference which is a reference to a track delivering a 'vopi' sample group, and wherein the track has the second track reference for the specific track that contains the operating point information sample group.

4. The method of claim 1, wherein, more based on the track not indicating the VVC bitstream after resolving at least one of specific track references, the track has one of the first track reference for the operating point entity group and the second track reference for the specific track that contains the operating point information sample group, and wherein the specific track references include a 'subp' track reference which is a referenced VVC subpicture track and a 'vvcN' track reference which is a referenced VVC non-VCL track.

5. The method of claim 4, wherein the track has the second track reference being a 'vref' track reference which is a reference to a track delivering a 'vopi' sample group, and wherein the track has the second track reference for the specific track that contains the operating point information sample group.

6. The method of claim 1, wherein, based on the track not including the VVC bitstream, the track has one of a first track reference for the operating point entity group or a second track reference for the specific track that contains the operating point information sample group.

7. The method of claim 6, wherein the track has the second track reference being a 'vref' track reference which is a reference to a track delivering a 'vopi' sample group, and wherein the track has the second track reference for the specific track that contains the operating point information sample group.

8. The method of claim 6, wherein, more based on the track not indicating the VVC bitstream after resolving at least one of specific track references, the track has one of the first track reference for the operating point entity group and the second track reference for the specific track that contains the operating point information sample group, and wherein the specific track references include a 'subp' track reference which is a referenced VVC subpicture track and a 'vvcN' track reference which is a referenced VVC non-VCL track.

9. A media file generating apparatus generating a media file by performing the method for generating a media file of claim 1.

10. A method for processing a media file, the method comprising:
obtaining the media file comprising a track and at least one of an entity group or a sample group;
parsing at least one of the entity group or the sample group; and
parsing the track,
wherein the entity group includes an operating point entity group,
wherein the sample group includes an operating point information sample group,
wherein based on the track not including a versatile video coding (VVC) bitstream, the track has one of a first track reference for the operating point entity group or a second track reference for a specific track that contains the operating point information sample group, and
wherein the first track reference is different from the second track reference.

11. The method of claim 10, wherein the operating point entity group is an 'opeg (operating point entity group)' entity group, and
wherein the operating point information sample group is a 'vopi (operating point information sample group)' sample group.

12. The method of claim 10, wherein the track has the second track reference being a 'vref' track reference which is a reference to a track delivering a 'vopi' sample group, and wherein the track has the second track reference for the specific track that contains the operating point information sample group.

13. The method of claim 10, wherein, more based on the track not indicating the VVC bitstream after resolving at least one of specific track references, the track has one of the first track reference for the operating point entity group and the second track reference for the specific track that contains the operating point information sample group, and wherein the specific track references include a 'subp' track reference which is a referenced VVC subpicture track and a 'vvcN' track reference which is a referenced VVC non-VCL track.

14. The method of claim 13, wherein the track has the second track reference being a 'vref' track reference which is a reference to a track delivering a 'vopi' sample group, and wherein the track has the second track reference for the specific track that contains the operating point information sample group.

15. The method of claim 10, wherein, based on the track not including the VVC bitstream, the track has one of a first track reference for the operating point entity group or a second track reference for the specific track that contains the operating point information sample group.

16. The method of claim 15, wherein the track has the second track reference being a 'vref' track reference which is a reference to a track delivering a 'vopi' sample group, and wherein the track has the second track reference for the specific track that contains the operating point information sample group.

17. A media file processing apparatus processing a media file by performing the method for processing a media file of claim 10.

* * * * *